(12) United States Patent
Zhang et al.

(10) Patent No.: US 12,326,495 B2
(45) Date of Patent: Jun. 10, 2025

(54) OBJECT LOCATING METHOD AND APPARATUS

(71) Applicant: HUAWEI TECHNOLOGIES CO., LTD., Shenzhen (CN)

(72) Inventors: Meihong Zhang, Shenzhen (CN); Xiao Han, Shenzhen (CN); Rui Du, Shenzhen (CN); Chenchen Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 363 days.

(21) Appl. No.: 17/837,843

(22) Filed: Jun. 10, 2022

(65) Prior Publication Data
US 2022/0308194 A1 Sep. 29, 2022

Related U.S. Application Data

(63) Continuation of application No. PCT/CN2020/135554, filed on Dec. 11, 2020.

(30) Foreign Application Priority Data

Dec. 13, 2019 (CN) .......................... 201911279740.2

(51) Int. Cl.
G01S 13/00 (2006.01)
G01S 7/00 (2006.01)
(Continued)

(52) U.S. Cl.
CPC ............ G01S 13/003 (2013.01); G01S 7/006 (2013.01); G01S 13/103 (2013.01); G01S 13/106 (2013.01); G01S 13/765 (2013.01)

(58) Field of Classification Search
CPC ...... G01S 13/003; G01S 7/006; G01S 13/103; G01S 13/106; G01S 13/765
See application file for complete search history.

(56) References Cited

U.S. PATENT DOCUMENTS

2008/0204322 A1* 8/2008 Oswald .................... G01S 5/04
342/465
2011/0025494 A1 2/2011 Adcook et al.
(Continued)

FOREIGN PATENT DOCUMENTS

CN 103576153 A * 2/2014 ............. G01S 13/12
CN 207399518 U 5/2018
(Continued)

OTHER PUBLICATIONS

IEEE P802.11az™/D1.0, "Draft Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications, Amendment 3: Enhancements for Positioning," Feb. 2019, 187 pages.
(Continued)

Primary Examiner — Timothy A Brainard
Assistant Examiner — Ismaaeel A. Siddiquee
(74) Attorney, Agent, or Firm — Fish & Richardson P.C.

(57) ABSTRACT

This application provides example object locating methods and apparatuses. One example method includes performing, by a first device, pulse measurement on a target object with assistance of a second device, where the pulse measurement is performed on the target object by using two types of pulse signals, and pulse repetition frequencies of the two types of pulse signals are different. The first device can then locate the target object based on a pulse measurement result of the pulse measurement.

20 Claims, 17 Drawing Sheets (a)

(b)

(51) Int. Cl.
*G01S 13/10* (2006.01)
*G01S 13/76* (2006.01)

(56) References Cited

U.S. PATENT DOCUMENTS

| | | | | |
|---|---|---|---|---|
| 2017/0048671 | A1* | 2/2017 | Marri Sridhar ... | H04W 56/0015 |
| 2017/0127385 | A1* | 5/2017 | Vermani ............ | H04B 7/0617 |
| 2018/0292518 | A1* | 10/2018 | Chu ................ | G01S 5/0205 |
| 2018/0341000 | A1* | 11/2018 | Cohen ............. | G01S 13/87 |
| 2019/0370569 | A1* | 12/2019 | Gulati ............. | G01S 13/931 |
| 2021/0116557 | A1* | 4/2021 | Ljung ............. | G01S 13/872 |
| 2021/0173065 | A1* | 6/2021 | Trainin ........... | G01S 13/003 |
| 2022/0095347 | A1* | 3/2022 | Huang ............. | H04L 1/0047 |

FOREIGN PATENT DOCUMENTS

| | | | | |
|---|---|---|---|---|
| CN | 108347691 | A | | 7/2018 |
| CN | 108387895 | A * | 8/2018 | ............ G01S 13/89 |
| CN | 109521424 | A | | 3/2019 |
| CN | 109884610 | A | | 6/2019 |
| CN | 110139353 | A | | 8/2019 |
| CN | 110366098 | A | | 10/2019 |
| CN | 110376576 | A | | 10/2019 |

OTHER PUBLICATIONS

International Search Report and Written Opinion in International Appln. No. PCT/CN2020/135554, mailed on Feb. 25, 2021, 19 pages (with English translation).

[No Author Listed] [online], "Range ambiguity and Doppler ambiguity," Range Blur and Doppler Blur, CSDN Blog, Mar. 13, 2014, retrieved on Aug. 13, 2024, retrieved from URL <https://blog.csdn.net/weixin_30709809/article/details/97129257>, 4 pages (with English translation).

CNBlogs.com [online], "Distance Blur and Doppler Blur," Mar. 13, 2014, retrieved from URL <https://www.cnblogs.com/leonli0534/p/3599432.html>, 7 pages (with English translation).

* cited by examiner (a)

(b)

500

| A first device performs pulse measurement on a target object with assistance of a second device | ⟶ S510 |

| The first device locates the target object based on a pulse measurement result | ⟶ S520 |

| A second device assists a first device in performing pulse measurement on a target object | ⟶ S610 |

FIG. 6

OBJECT LOCATING METHOD AND APPARATUS

CROSS-REFERENCE TO RELATED APPLICATIONS

This application is a continuation of International Application No. PCT/CN2020/135554, filed on Dec. 11, 2020, which claims priority to Chinese Patent Application No. 201911279740.2, filed on Dec. 13, 2019. The disclosures of the aforementioned applications are hereby incorporated by reference in their entireties.

TECHNICAL FIELD

This application relates to the communications field, and more specifically, to an object locating method and apparatus based on fine timing measurement (fine timing measurement, FTM).

BACKGROUND

A radar may be used to detect a target object, for example, detect one or more of a distance, a speed and a direction angle (including an azimuth angle and a pitch angle) of a target object relative to the radar. The radar usually includes a transmit antenna and a receive antenna. The radar may transmit a radar signal (referred to as a transmitted wave) by using the transmit antenna, and receive, by using the receive antenna, a radar signal (referred to as a reflected wave) formed through reflecting the transmitted wave by the target object. Then, a radar measurement result may be obtained based on a change in the reflected wave relative to the transmitted wave, for example, the distance, the moving speed and the direction angle of the target object relative to the radar, or other information for calculating any one of the distance, the moving speed and the direction angle of the target object relative to the radar.

A wireless local area network (wireless local area network, WLAN) has been widely deployed and applied as a local communications network with convenient access and a high data transmission rate. In a densely deployed WLAN, one access point (access point, AP) is usually connected to a plurality of stations (stations, STAs), and the STAs may be used as radars configured to detect a target object.

Usually, the AP may determine, from the plurality of STAs covered by the AP, a plurality of target STAs that can be configured to detect the target object under coordination of the AP. Then, the AP determines location information of the plurality of target STAs, and coordinates the plurality of target STAs to perform radar measurement on the target object. Next, the AP or a computing device connected to the AP may locate the target object based on the location information of the plurality of target STAs and a radar measurement result obtained when the radar measurement is performed on the target object.

Radars can be classified into a pulse radar and a continuous-wave radar based on a transmit signal form classification. When the pulse radar performs measurement, a high-pulse repetition frequency (pulse repetition frequency, PRF) pulse signal may provide a high transmit power and an excellent clutter suppression capability. However, in a conventional technology, when a high-PRF pulse radar is used to perform measurement, distance ambiguity occurs when a target distance is greater than a maximum distance corresponding to a pulse repetition period, and therefore a measured distance is not an actual distance, and accurate location information of an object cannot be obtained.

SUMMARY

This application provides an object locating method, to help eliminate a measurement error caused by distance ambiguity in a case of a high PRF. This improves accuracy of obtained object location information, and implements high-precision target locating.

According to a first aspect, an object locating method is provided. The method includes:

A first device performs pulse measurement on a target object with assistance of a second device.

The pulse measurement is performed on the target object by using two types of pulse signals, and pulse repetition frequencies of the two types of pulse signals are different. The first device locates the target object based on a pulse measurement result.

It should be understood that the pulse measurement result may include a measurement value obtained by measuring the object with the two types of pulse signals.

Optionally, the first device may be an access point AP, and the second device may be a wireless communications device, for example, a station STA, having a transmit antenna and a receive antenna.

With reference to the first aspect, in some implementations of the first aspect, the pulse repetition frequencies of the two types of pulse signals are prime numbers of each other.

This eliminates a measurement error caused by distance ambiguity in a case of a high PRF by sending the pulse repetition frequencies, of the two types of pulse signals, that are the prime numbers of each other. This improves accuracy of obtained object location information, and implements high-precision target locating.

With reference to the first aspect, in some implementations of the first aspect, the pulse measurement is performed in a fine timing measurement FTM process of the first device and the second device.

The active ranging method FTM measurement between the first device and the second device is used in combination with a multi-PRF pulse measurement process that is performed by the first device with the assistance of the second device. Therefore, a precise locating result of a passive target can be obtained.

With reference to the first aspect, in some implementations of the first aspect, the two types of pulse signals are both sent by the second device.

With reference to the first aspect, in some implementations of the first aspect, that a first device performs pulse measurement on a target object with assistance of a second device includes: The first device sends a first information frame to the second device. The first information frame is used to trigger the second device to perform pulse measurement on the target object by using a target pulse signal, and the target pulse signal is one or two of the two types of pulse signals.

Optionally, the two types of pulse signals may be sequentially sent after the first information frame is sent for one time, or may be separately sent after the first information frame is sent for two times.

The two types of pulse signals are sequentially sent after the first information frame is sent for one time. Therefore, an interaction process can be shortened, channel resources can be reduced, and measurement efficiency can be improved.

With reference to the first aspect, in some implementations of the first aspect, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

With reference to the first aspect, in some implementations of the first aspect, the indication information used to indicate the second device to perform pulse measurement includes one or more of the following parameters of the target pulse signal: a pulse repetition frequency, a duration length, a waveform, a coding scheme, and occupied bandwidth.

With reference to the first aspect, in some implementations of the first aspect, the pulse repetition frequency of the target pulse signal is indicated by using a bitmap.

With reference to the first aspect, in some implementations of the first aspect, the second device is one of a plurality of devices that assist the first device in performing pulse measurement on the target object; and the first device simultaneously triggers the plurality of devices to perform pulse measurement on the target object by using one first information frame, or the first device triggers different devices in the plurality of devices to perform pulse measurement on the target object by using different first information frames.

Channel utilization can be improved by simultaneously triggering, by using the same first information frame, the plurality of devices to perform measurement on the target object.

With reference to the first aspect, in some implementations of the first aspect, the two types of pulse signals are both sent by the first device.

With reference to the first aspect, in some implementations of the first aspect, that a first device performs pulse measurement on a target object with assistance of a second device includes: The first device sends a second information frame to the second device. The second information frame is used to notify the second device that the first device is to perform pulse measurement on the target object.

With reference to the first aspect, in some implementations of the first aspect, a subtype field in a frame control field in the second information frame includes an identifier of the second information frame.

With reference to the first aspect, in some implementations of the first aspect, a station info field, having a special AID value, in the second information frame includes a parameter of a target pulse signal used by the first device, and the target pulse signal is one or two of the two types of pulse signals.

With reference to the first aspect, in some implementations of the first aspect, that a first device performs pulse measurement on a target object with assistance of a second device includes: The first device sends a third information frame to the second device. The third information frame is used to query whether the second device participates in the pulse measurement of the target object.

With reference to the first aspect, in some implementations of the first aspect, that a first device performs pulse measurement on a target object with assistance of a second device includes: The first device sends a fourth information frame to the second device. The fourth information frame includes: first indication information and/or second indication information, the first indication information is used to indicate whether the second device needs to report a pulse measurement result of the target object, and the second indication information is used to indicate whether the second device needs to report an FTM measurement result.

Optionally, the FTM measurement result may include timestamps at which an uplink NDP and a downlink NDP leave and arrive at the second device. The pulse measurement result may include a measurement value obtained by measuring the object with the two types of pulse signals.

With reference to the first aspect, in some implementations of the first aspect, the fourth information frame includes a common info field, and the first indication information and the second indication information are included in a feedback control field in the common info field.

According to a second aspect, an object locating method is provided. The method includes: A second device assists a first device in performing pulse measurement on a target object. The pulse measurement is performed on the target object by using two types of pulse signals, and pulse repetition frequencies of the two types of pulse signals are different.

Optionally, the first device may be an access point AR and the second device may be a wireless communications device, for example, a station STA, having a transmit antenna and a receive antenna.

With reference to the second aspect, in some implementations of the second aspect, the pulse repetition frequencies of the two types of pulse signals are prime numbers of each other.

This eliminates a measurement error caused by distance ambiguity in a case of a high PRF by sending the pulse repetition frequencies, of the two types of pulse signals, that are the prime numbers of each other. This improves accuracy of obtained object location information, and implements high-precision target locating.

With reference to the second aspect, in some implementations of the second aspect, the pulse measurement is performed in a fine timing measurement FTM process of the first device and the second device.

The active ranging method FTM measurement between the first device and the second device is used in combination with a multi-PRF pulse measurement process that is performed by the first device with assistance of the second device. Therefore, a precise locating result of a passive target can be obtained.

With reference to the second aspect, in some implementations of the second aspect, the two types of pulse signals are both sent by the second device.

With reference to the second aspect, in some implementations of the second aspect, that a second device assists a first device in performing pulse measurement on a target object includes: The second device receives a first information frame sent by the first device. The first information frame is used to trigger the second device to perform pulse measurement on the target object by using a target pulse signal, and the target pulse signal is one or two of the two types of pulse signals.

Optionally, the two types of pulse signals may be sequentially sent after the first information frame is sent for one time, or may be separately sent after the first information frame is sent for two times.

The two types of pulse signals are sequentially sent after the first information frame is sent for one time. Therefore, an interaction process can be shortened, channel resources can be reduced, and measurement efficiency can be improved.

With reference to the second aspect, in some implementations of the second aspect, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

With reference to the second aspect, in some implementations of the second aspect, the indication information used to indicate the second device to perform pulse measurement includes one or more of the following parameters of the target pulse signal: a pulse repetition frequency, a duration length, a waveform, a coding scheme, and occupied bandwidth.

With reference to the second aspect, in some implementations of the second aspect, the pulse repetition frequency of the target pulse signal is indicated by using a bitmap.

With reference to the second aspect, in some implementations of the second aspect, the second device is one of a plurality of devices that assist the first device in performing pulse measurement on the target object; and the first device simultaneously triggers the plurality of devices to perform pulse measurement on the target object by using one information frame, or the first device triggers different devices in the plurality of devices to perform pulse measurement on the target object by using different information frames.

Channel utilization can be improved by simultaneously triggering, by using the same first information frame, the plurality of devices to perform measurement on the target object.

With reference to the second aspect, in some implementations of the second aspect, the two types of pulse signals are both sent by the first device.

With reference to the second aspect, in some implementations of the second aspect, that a second device assists a first device in performing pulse measurement on a target object includes: The second device receives a second information frame sent by the first device. The second information frame is used to notify the second device that the first device is to perform pulse measurement on the target object.

With reference to the second aspect, in some implementations of the second aspect, a subtype field in a frame control field in the second information frame includes an identifier of the second information frame.

With reference to the second aspect, in some implementations of the second aspect, a station info field, having a special AID value, in the second information frame includes a parameter of a target pulse signal used by the first device, and the target pulse signal is one or two of the two types of pulse signals.

With reference to the second aspect, in some implementations of the second aspect, that a second device assists a first device in performing pulse measurement on a target object includes: The second device receives a third information frame sent by the first device. The third information frame is used to query whether the second device participates in the pulse measurement of the target object.

With reference to the second aspect, in some implementations of the second aspect, that a second device assists a first device in performing pulse measurement on a target object includes: The second device receives a fourth information frame sent by the first device. The fourth information frame includes first indication information and/or second indication information, the first indication information is used to indicate whether the second device needs to report a pulse measurement result of the target object, and the second indication information is used to indicate whether the second device needs to report an FTM measurement result.

Optionally, the FTM measurement result may include timestamps at which an uplink NDP and a downlink NDP leave and arrive at the second device. The pulse measurement result may include a measurement value obtained by measuring the object with the two types of pulse signals.

With reference to the second aspect, in some implementations of the second aspect, the fourth information frame includes a common info field, and the first indication information and the second indication information are included in a feedback control field in the common info field.

According to a third aspect, an object locating apparatus is provided. The apparatus includes: a measurement module, configured to perform pulse measurement on a target object with assistance of a second device, where the pulse measurement is performed on the target object by using two types of pulse signals, and pulse repetition frequencies of the two types of pulse signals are different; and a processing module, configured to locate the target object based on a pulse measurement result.

Optionally, a first device may be an access point AP, and the second device may be a wireless communications device, for example, a station STA, having a transmit antenna and a receive antenna.

With reference to the third aspect, in some implementations of the third aspect, the pulse repetition frequencies of the two types of pulse signals are prime numbers of each other.

This eliminates a measurement error caused by distance ambiguity in a case of a high PRF by sending the pulse repetition frequencies, of the two types of pulse signals, that are the prime numbers of each other. This improves accuracy of obtained object location information, and implements high-precision target locating.

With reference to the third aspect, in some implementations of the third aspect, the pulse measurement is performed in a fine timing measurement FTM process of the first device and the second device.

The active ranging method FTM measurement between the first device and the second device is used in combination with a multi-PRF pulse measurement process that is performed by the first device with assistance of the second device. Therefore, a precise locating result of a passive target can be obtained.

With reference to the third aspect, in some implementations of the third aspect, the two types of pulse signals are both sent by the second device.

With reference to the third aspect, in some implementations of the third aspect, the apparatus further includes a first sending module, configured to send a first information frame to the second device. The first information frame is used to trigger the second device to perform pulse measurement on the target object by using a target pulse signal, and the target pulse signal is one or two of the two types of pulse signals.

Optionally, the two types of pulse signals may be sequentially sent after the first information frame is sent for one time, or may be separately sent after the first information frame is sent for two times.

The two types of pulse signals are sequentially sent after the first information frame is sent for one time. Therefore, an interaction process can be shortened, channel resources can be reduced, and measurement efficiency can be improved.

With reference to the third aspect, in some implementations of the third aspect, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

With reference to the third aspect, in some implementations of the third aspect, the indication information used to indicate the second device to perform pulse measurement includes one or more of the following parameters of the target pulse signal: a pulse repetition frequency, a duration length, a waveform, a coding scheme, and occupied bandwidth.

With reference to the third aspect, in some implementations of the third aspect, the pulse repetition frequency of the target pulse signal is indicated by using a bitmap.

With reference to the third aspect, in some implementations of the third aspect, the second device is one of a plurality of devices that assist the first device in performing pulse measurement on the target object; and the first device simultaneously triggers the plurality of devices to perform pulse measurement on the target object by using one first information frame, or the first device triggers different devices in the plurality of devices to perform pulse measurement on the target object by using different first information frames.

Channel utilization can be improved by simultaneously triggering, by using the same first information frame, the plurality of devices to perform measurement on the target object.

With reference to the third aspect, in some implementations of the third aspect, the apparatus further includes a second sending module, configured to send the two types of pulse signals.

With reference to the third aspect, in some implementations of the third aspect, the apparatus further includes a third sending module, configured to send a second information frame to the second device. The second information frame is used to notify the second device that the first device is to perform pulse measurement on the target object.

With reference to the third aspect, in some implementations of the third aspect, a subtype field in a frame control field in the second information frame includes an identifier of the second information frame.

With reference to the third aspect, in some implementations of the third aspect, a station info field, having a special AID value, in the second information frame includes a parameter of a target pulse signal used by the first device, and the target pulse signal is one or two of the two types of pulse signals.

With reference to the third aspect, in some implementations of the third aspect, the apparatus further includes a fourth sending module, configured to send a third information frame to the second device. The third information frame is used to query whether the second device participates in the pulse measurement of the target object.

With reference to the third aspect, in some implementations of the third aspect, the apparatus further includes a fifth sending module, configured to send a fourth information frame to the second device. The fourth information frame includes first indication information and/or second indication information, the first indication information is used to indicate whether the second device needs to report a pulse measurement result of the target object, and the second indication information is used to indicate whether the second device needs to report an FTM measurement result.

Optionally, the FTM measurement result may include timestamps at which an uplink NDP and a downlink NDP leave and arrive at the second device. The pulse measurement result may include a measurement value obtained by measuring the object with the two types of pulse signals.

With reference to the third aspect, in some implementations of the third aspect, the fourth information frame includes a common info field, and the first indication information and the second indication information are included in a feedback control field in the common info field.

According to a fourth aspect, an object locating apparatus is provided. The apparatus includes a measurement module, configured to assist a first device in performing pulse measurement on a target object. The pulse measurement is performed on the target object by using two types of pulse signals, and pulse repetition frequencies of the two types of pulse signals are different.

Optionally, the first device may be an access point AP, and a second device may be a wireless communications device, for example, a station STA, having a transmit antenna and a receive antenna.

With reference to the fourth aspect, in some implementations of the fourth aspect, the pulse repetition frequencies of the two types of pulse signals are prime numbers of each other.

This eliminates a measurement error caused by distance ambiguity in a case of a high PRF by sending the pulse repetition frequencies, of the two types of pulse signals, that are the prime numbers of each other. This improves accuracy of obtained object location information, and implements high-precision target locating.

With reference to the fourth aspect, in some implementations of the fourth aspect, the pulse measurement is performed in a fine timing measurement FTM process of the first device and the second device.

The active ranging method FTM measurement between the first device and the second device is used in combination with a multi-PRF pulse measurement process that is performed by the first device with assistance of the second device. Therefore, a precise locating result of a passive target can be obtained.

With reference to the fourth aspect, in some implementations of the fourth aspect, the apparatus further includes a first sending module, configured to send the two types of pulse signals.

With reference to the fourth aspect, in some implementations of the fourth aspect, the apparatus further includes a first receiving module, configured to receive a first information frame sent by the first device. The first information frame is used to trigger the second device to perform pulse measurement on the target object by using a target pulse signal, and the target pulse signal is one or two of the two types of pulse signals.

Optionally, the two types of pulse signals may be sequentially sent after the first information frame is sent for one time, or may be separately sent after the first information frame is sent for two times.

The two types of pulse signals are sequentially sent after the first information frame is sent for one time. Therefore, an interaction process can be shortened, channel resources can be reduced, and measurement efficiency can be improved.

With reference to the fourth aspect, in some implementations of the fourth aspect, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

With reference to the fourth aspect, in some implementations of the fourth aspect, the indication information used to indicate the second device to perform pulse measurement includes one or more of the following parameters of the target pulse signal: a pulse repetition frequency, a duration length, a waveform, a coding scheme, and occupied bandwidth.

With reference to the fourth aspect, in some implementations of the fourth aspect, the pulse repetition frequency of the target pulse signal is indicated by using a bitmap.

With reference to the fourth aspect, in some implementations of the fourth aspect, the second device is one of a plurality of devices that assist the first device in performing pulse measurement on the target object; and the first device simultaneously triggers the plurality of devices to perform pulse measurement on the target object by using one information frame, or the first device triggers different devices in the plurality of devices to perform pulse measurement on the target object by using different information frames.

Channel utilization can be improved by simultaneously triggering, by using the same first information frame, the plurality of devices to perform measurement on the target object.

With reference to the fourth aspect, in some implementations of the fourth aspect, the two types of pulse signals are both sent by the first device.

With reference to the fourth aspect, in some implementations of the fourth aspect, the second apparatus further includes a second receiving module, configured to receive a second information frame sent by the first device. The second information frame is used to notify the second device that the first device is to perform pulse measurement on the target object.

With reference to the fourth aspect, in some implementations of the fourth aspect, a subtype field in a frame control field in the second information frame includes an identifier of the second information frame.

With reference to the fourth aspect, in some implementations of the fourth aspect, a station info field, having a special AID value, in the second information frame includes a parameter of a target pulse signal used by the first device, and the target pulse signal is one or two of the two types of pulse signals.

With reference to the fourth aspect, in some implementations of the fourth aspect, the apparatus further includes a third receiving module, configured to receive a third information frame sent by the first device. The third information frame is used to query whether the second device participates in the pulse measurement of the target object.

With reference to the fourth aspect, in some implementations of the fourth aspect, the apparatus further includes a fourth receiving module, configured to receive a fourth information frame sent by the first device. The fourth information frame includes first indication information and/or second indication information, the first indication information is used to indicate whether the second device needs to report a pulse measurement result of the target object, and the second indication information is used to indicate whether the second device needs to report an FTM measurement result.

Optionally, the FTM measurement result may include timestamps at which an uplink NDP and a downlink NDP leave and arrive at the second device. The pulse measurement result may include a measurement value obtained by measuring the object with the two types of pulse signals.

With reference to the fourth aspect, in some implementations of the fourth aspect, the fourth information frame includes a common info field, and the first indication information and the second indication information are included in a feedback control field in the common info field.

According to a fifth aspect, a computer-readable medium is provided, configured to store a computer program. The computer program includes instructions used to perform the method according to any one of the first aspect or the possible implementations of the first aspect.

According to a sixth aspect, a computer-readable medium is provided, configured to store a computer program. The computer program includes instructions used to perform the method according to any one of the second aspect or the possible implementations of the second aspect.

According to a seventh aspect, a computer program product is provided, including a computer program. When the computer program runs on a computer device, a processing unit in the computer device is enabled to perform the method according to the first aspect.

According to an eighth aspect, a computer program product is provided, including a computer program. When the computer program runs on a computer device, a processing unit in the computer device is enabled to perform the method according to the second aspect.

According to a ninth aspect, a communications apparatus is provided. The communications apparatus has a function of the first device in the foregoing aspects. The function of the first device may be implemented by hardware, or may be implemented by hardware executing corresponding software. The hardware or the software includes one or more units corresponding to the foregoing function.

According to a tenth aspect, a communications apparatus is provided. The communications apparatus has a function of the second device in the foregoing aspects. The function of the second device may be implemented by hardware, or may be implemented by hardware executing corresponding software. The hardware or the software includes one or more units corresponding to the foregoing function.

According to an eleventh aspect, a communications apparatus is provided. The communications apparatus may be the first device in the foregoing aspects, or may be a chip disposed in the first device. The communications apparatus includes a memory, a communications interface, and a processor. The memory is configured to store a computer program or instructions. The processor is coupled to the memory and the communications interface. When the processor executes the computer program or the instructions, the communications apparatus performs the method according to any one of the first aspect.

According to a twelfth aspect, a communications apparatus is provided. The communications apparatus may be the second device in the foregoing aspects, or may be a chip disposed in the second device. The communications apparatus includes a memory, a communications interface, and a processor. The memory is configured to store a computer program or instructions. The processor is coupled to the memory and the communications interface. When the processor executes the computer program or the instructions, the communications apparatus performs the method according to any one of the second aspect.

According to a thirteenth aspect, a chip system is provided. The chip system includes a processor, configured to implement a function of the first device in the foregoing aspects, for example, receive or process data and/or information in the method according to the first aspect. In a possible design, the chip system further includes a memory.

The memory is configured to store program instructions and/or data. The chip system may include a chip, or may include a chip and another discrete device.

According to a fourteenth aspect, a chip system is provided. The chip system includes a processor, configured to implement a function of the second device in the foregoing aspects, for example, receive or process data and/or information in the method according to the second aspect. In a possible design, the chip system further includes a memory. The memory is configured to store program instructions and/or data. The chip system may include a chip, or may include a chip and another discrete device.

BRIEF DESCRIPTION OF DRAWINGS

FIG. 5 is a schematic diagram of an object locating method according to an embodiment of this application;

FIG. 6 is a schematic diagram of another object locating method according to an embodiment of this application;

DESCRIPTION OF EMBODIMENTS

The following clearly and completely describes the technical solutions in embodiments of this application with reference to the accompanying drawings in embodiments of this application. It is clearly that the described embodiments are some but not all of embodiments of this application.

Embodiments of this application may be used to locate an object. The target object includes but is not limited to a person or people, for example, may further include physical devices in various forms.

In embodiments of this application, a first device may be an access point (access point, AP), and a second device may be a wireless communications device, for example, a station (station, STA), having a transmit antenna and a receive antenna. An AP is a network device that connects the STA to a wired network. A network coverage range of a single AP can reach tens of meters. Communication between the AP and STAs within the coverage range of the AP is usually performed according to the Institute of Electrical and Electronics Engineers (institute of electrical and electronics engineers, IEEE) 802.11 protocol. The STA may be a wireless communications device having a transmit antenna and a receive antenna, and the wireless communications device usually has mobility. The wireless communications device may also be referred to as a mobile device (mobile device, MD), user equipment (user equipment, UE), a terminal (terminal), a mobile station (mobile station, MS), or a mobile terminal (mobile terminal, MT). Specifically, the STA includes but is not limited to various forms of a mobile phone (or referred to as a "cellular" phone), a notebook computer, a tablet computer, and a desktop computer having a wireless communications module. For example, the STA may further include various forms of Internet of Things terminals and various portable, pocket-sized, hand-held, computer built-in, or vehicle-mounted mobile devices.

Figure 1:
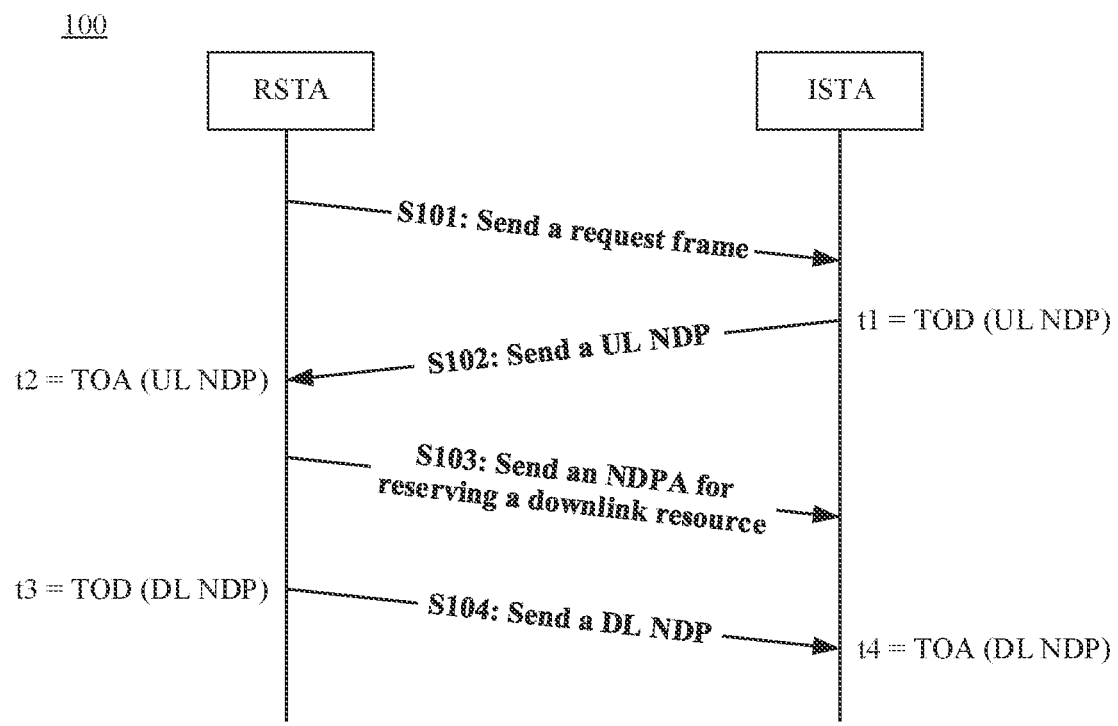
FIG. 1 is a schematic diagram of a measurement process in which an FTM technology is used.

An existing network resource can be fully utilized by introducing radar measurement in a WLAN. This is a very promising technology in the future. An FTM technology is usually used in the industry to perform radar measurement in a WLAN. In the FTM technology, a measurement packet is sent by one responder station (responder station, RSTA) and a plurality of initiator stations (initiator station, ISTA) to each other. A location relationship between the RSTA and the ISTA is calculated by measuring time of flight of the measurement packet. Both the RSTA and the ISTA are active objects (namely, objects that can receive and send an electromagnetic wave). For example, FIG. 1 is a schematic diagram of a measurement process in which an FTM technology is used. As shown in FIG. 1, an RSTA and an ISTA measure, by using four steps: S101 to S104, sending time and receiving time of four data packets, namely, sending time $t_1$ of an uplink null data packet UL NDP, receiving time $t_2$ of the UL NDP, sending time $t_3$ of a downlink null data packet DL NDP, and receiving time $t_4$ of the DL NDP, to obtain a round trip time (round trip time, RTT) of the data packet in the air, where the RTT=$[(t_4-t_1)-(t_3-t_2)]$. Further, a distance, namely, c*RTT/2, between the ISTA and the RSTA is obtained, where c is a speed of light.

However, the FTM technology used in the industry can only measure locations between active objects. In other words, both parties need to be capable of receiving and sending an electromagnetic wave. However, in an actual environment, many passive objects (objects, for example, people, without a capability of sending and receiving electromagnetic waves) need to be measured. In this case, the FTM technology cannot be implemented.

To measure a passive object, in the conventional technology, a station (station, STA) is used to assist an access point (access point, AP) in measuring the passive object. The AP obtains information such as a distance and a speed, of the object, relative to the STA, and measures the passive object by combining information such as a location and a speed of the STA and combining the FTM technology with passive measurement.

Figure 2:
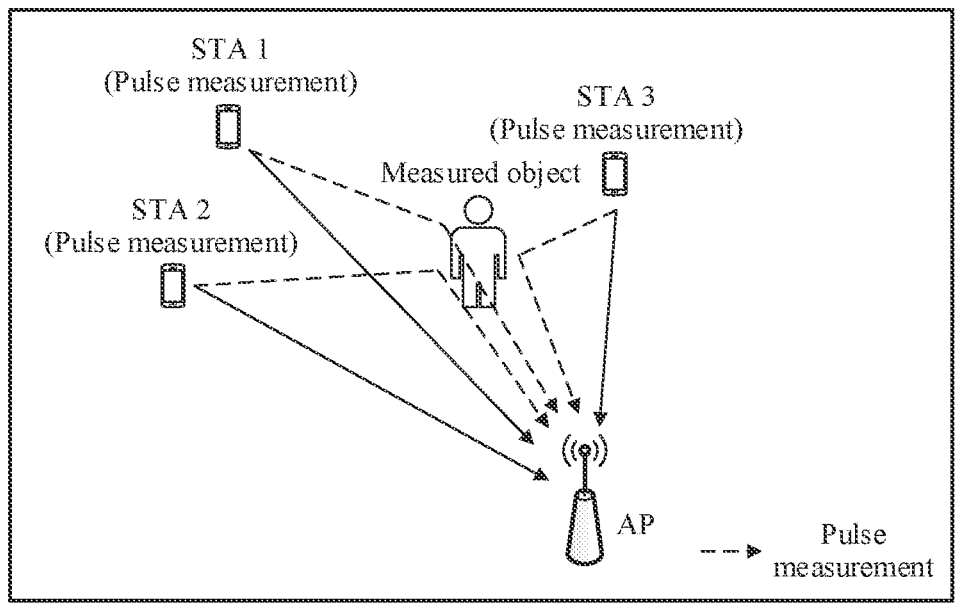
FIG. 2 is a schematic diagram of an application scenario according to an embodiment of this application.
Figure 2:
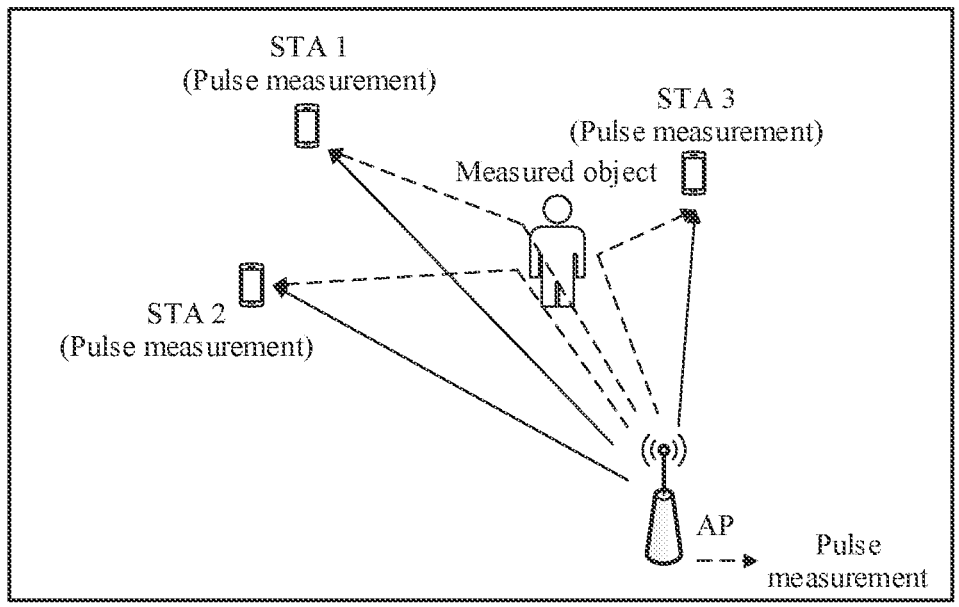

FIG. 2 is a schematic diagram of an application scenario according to an embodiment of this application. In a WLAN environment shown in FIG. 2, there is one access point AP and a plurality of STAs (bistatic radars) with a pulse measurement function. Before transmitting a pulse signal, a transmit end and a receive end need to implement space, time, and phase synchronization. As shown in FIG. 2(a), an AP coordinates a STA to send the pulse signal to a measured object in the figure; or as shown in FIG. 2(b), the AP sends the pulse signal to the measured object in the figure. Then, the STA feeds back a measurement result to the AP. Therefore, FTM measurement (a solid-line part in the figure) and measurement in which a STA assists an AP (a dashed-line part in the figure) are combined to measure a location of the measured passive object.

Figure 3:
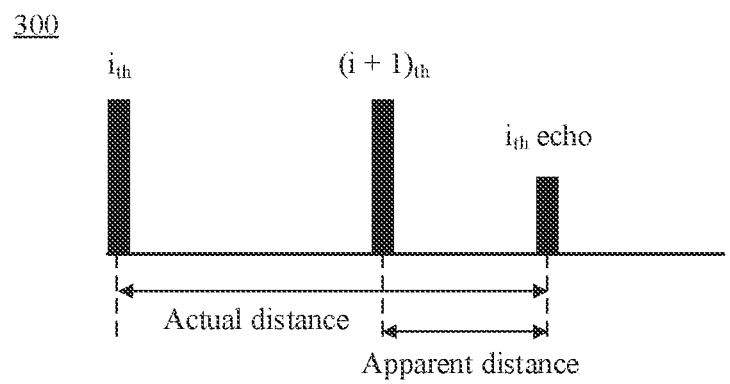
FIG. 3 is a schematic diagram of a principle of distance ambiguity in radar measurement.

However, in radar measurement in which a high PRF pulse signal is used, there is a distance ambiguity problem when the passive object is measured in the conventional technology by combining the FTM technology and the technology in which a STA assists an AP. Distance ambiguity means that when a target distance is greater than a maximum distance corresponding to a pulse repetition period, a target echo does not fall within the current period, and a target distance measured herein is a non-actual distance, referred to as an apparent distance or a blurred distance. FIG. 3 is a schematic diagram of a principle of distance ambiguity in radar measurement. For a given PRF, a maximum distance that a one-way echo can be received is referred to as a maximum non-ambiguity distance, which is typically represented by $R_u$, and a bistatic expression is:

$$R_u = cT = \frac{c}{f_r}, \tag{1}$$

where c is a speed of light, T is a pulse repetition period, and $f_r$ is a pulse repetition frequency.

Figure 4:
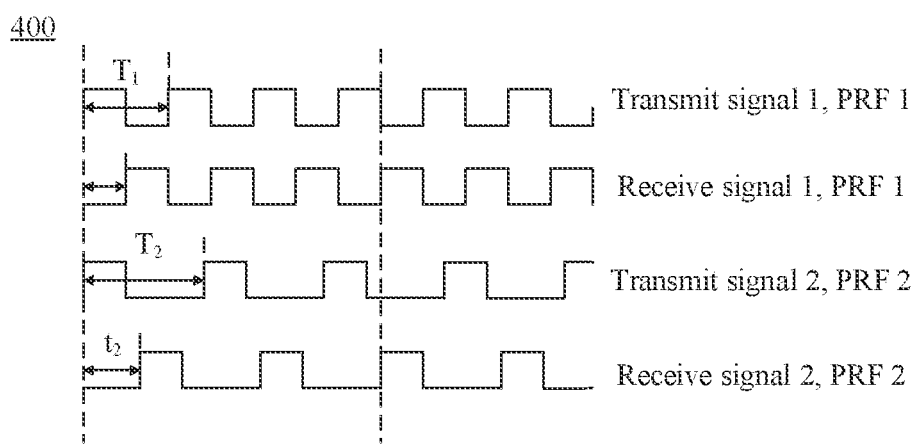
FIG. 4 is a schematic diagram of a principle of resolving a distance ambiguity problem according to an embodiment of this application.

In this embodiment of this application, a distance ambiguity problem is resolved by using a plurality of high-PRF pulse signals in each processing period. FIG. 4 is a schematic diagram of a principle of resolving a distance ambiguity problem according to an embodiment of this application. As shown in FIG. 4, pulse signals of two types of PRFs are transmitted: a transmit signal 1 and a transmit signal 2. PRFs of the transmit signal 1 and the transmit signal 2 are respectively a PRF 1 and a PRF 2, where the PRF 1 and the PRF 2 are prime numbers of each other. $R_{u1}$ and $R_{u2}$ are set to respectively represent maximum non-ambiguity distances of the two transmit signals. Usually, the two distances are less than a maximum non-ambiguity distance expected by a radar. $T_1$ is a pulse repetition period of the transmit signal 1, and $T_2$ is a pulse repetition period of the transmit signal 2. $t_1$ is time from a time point at which a pulse of the transmit signal 1 is transmitted to a time point at which an echo is received, and $t_2$ is time from a time point at which a pulse of the transmit signal 2 is transmitted to a time point at which an echo is received. In a measurement process, an actual distance in a bistatic case can be calculated based on the obtained $t_1$ and $t_2$.

When $t_1 < t_2$, $$R = ct, \text{ and } t = \frac{t_2 - t_1}{T_2 - T_1} T_1 + t_1. \tag{2}$$

When $t_1 > t_2$, $$R = ct, \text{ and } t = \frac{(t_2 - t_1) + T_2}{T_2 - T_1} T_1 + t_1. \tag{3}$$

When $t_1 = t_2$, $$R = ct, \text{ and } t = t_1 = t_2 \tag{4}.$$

In the formula, R is a target actual distance, and t is time from a time point at which a pulse is transmitted to a time point at which an echo is received.

FIG. 5 is a schematic diagram of an object locating method according to an embodiment of this application. As shown in FIG. 5, the method 500 includes steps S510 and S520. The following describes these steps in detail.

S510: A first device performs pulse measurement on a target object with assistance of a second device.

In an embodiment, the pulse measurement is performed on the target object by using two types of pulse signals, and pulse repetition frequencies of the two types of pulse signals are different.

Optionally, the pulse repetition frequencies of the two types of pulse signals are prime numbers of each other.

The pulse measurement may be performed in a fine timing measurement FTM process of the first device and the second device.

The active ranging method FTM measurement between the first device and the second device is used in combination with a multi-PRF pulse measurement process that is performed by the first device with assistance of the second device. Therefore, a precise locating result of a passive target can be obtained.

In an embodiment, both of the two types of pulse signals may be sent by the second device. When the second device sends the two types of pulse signals, the first device may send a first information frame to the second device, where the first information frame is used to trigger the second device to perform pulse measurement on the target object by using a target pulse signal. Optionally, the second device may send the two types of pulse signals at one time after the first device sends the first information frame for one time, or the second device may separately send the two types of pulse signals after the first device sends the first information frame for two times.

The two types of pulse signals are sequentially sent after the first device sends the first information frame for one time. Therefore, an interaction process can be shortened, channel resources can be reduced, and measurement efficiency can be improved.

Figure 16:
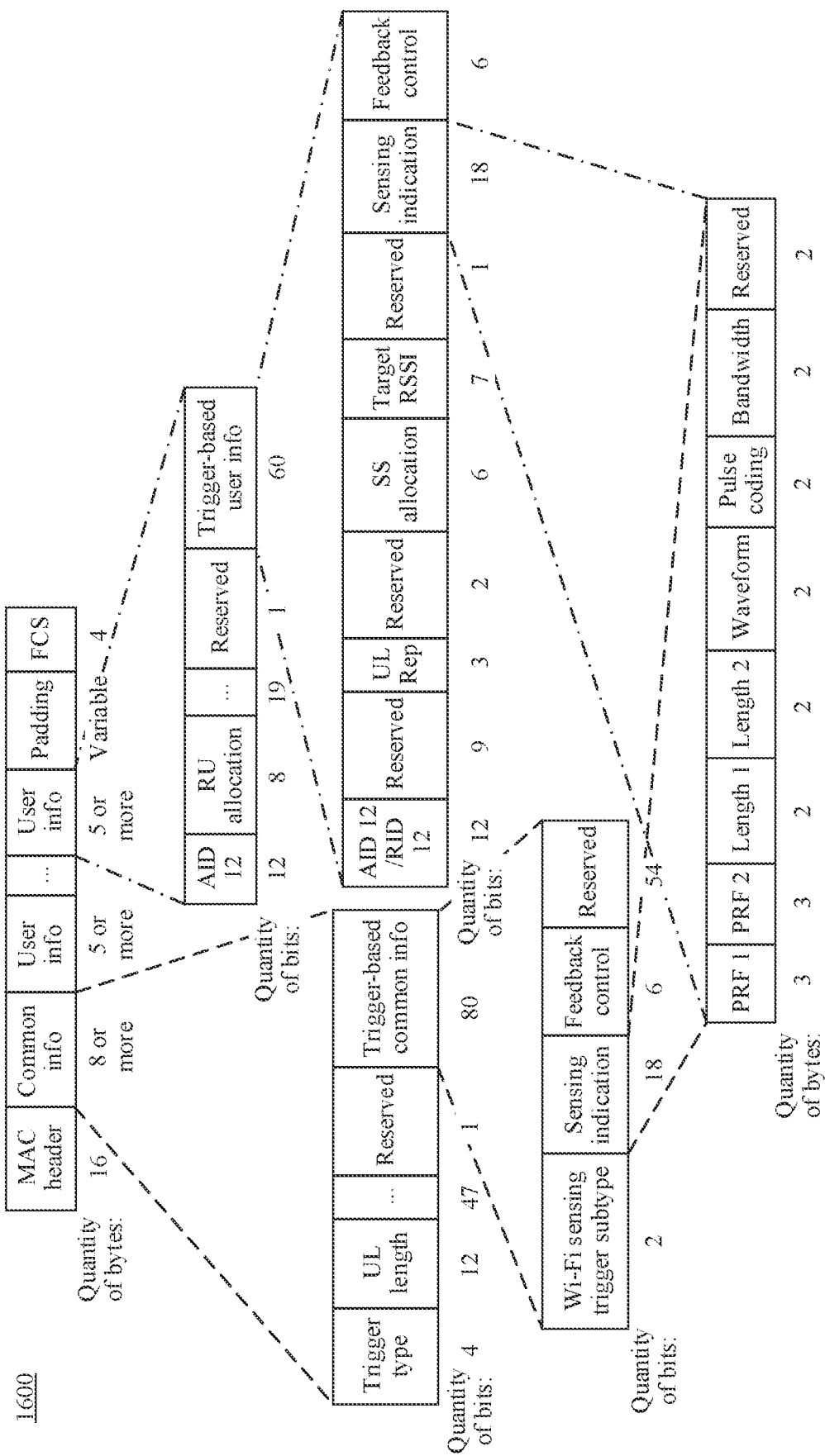
FIG. 16 is a schematic diagram of a first information frame (test frame) according to an embodiment of this application.

In a specific example, the first information frame may have a structure shown in FIG. 16. As shown in FIG. 16, the first information frame may include a media access control (media access control, MAC) header (MAC header) domain, a common info (common info) domain, one or more user info (user info) domains, a padding (padding) domain, and a frame check sequence (frame check sequence, FCS) domain. The common info domain may include at least a trigger type (trigger type) field, a UL length (UL length) field, a reserved (reserved) field, and a trigger dependent common info (trigger dependent common info) field. The trigger dependent common info field may include subfields: a Wi-Fi sensing trigger subtype (Wi-Fi sensing trigger subtype), a sensing indication (sensing indication), feedback control (feedback control), and reserved (reserved). The subfield, namely, the sensing indication (sensing indication), is used to indicate some parameters, of the pulse measurement, including a pulse repetition frequency PRF 1 and a PRF 2 of the pulse signals, a length 1 (length 1), a length 2 (length 2), a waveform (waveform), pulse coding (pulse coding), and bandwidth (bandwidth). One user info domain may include at least an identifier (application identifier, AID) field, an RU allocation (RU allocation) field, a reserved field, and a trigger dependent user info (trigger dependent user info) field. The AID field is used to store an identifier of a STA. The trigger dependent user info field may include at least a sensing indication subfield, used to indicate some parameters of the pulse measurement.

It should be understood that when the first device communicates with one second device according to the IEEE 802.11 protocol, a trigger frame that is sent by the first device to the second device and that is used to trigger the second device to perform a specific service usually includes fields as shown in FIG. 16: the MAC header domain, the common info domain, the one or more user info domains, the padding domain, and the FCS domain. The second device may determine a trigger type of the information frame based on a value of the trigger type field included in the common info domain of the trigger frame. For example, the information frame from the second device is used to indicate the second device to execute a service process related to a trigger type "Wi-Fi sensing (Wi-Fi sensing)", and a value of the trigger type field may be 9.

In this embodiment of this application, the information frame that is from the first device and that is used to trigger the second device to perform the service process related to "Wi-Fi sensing" includes but is not limited to a first information frame (Wi-Fi sensing sounding frame). For example, the information frame may further include a second information frame (null data packet announcement, NDPA), a third information frame (Wi-Fi sensing poll frame), and a fourth information frame (Wi-Fi sensing report frame (Wi-Fi sensing report)).

In a more specific example, the first device may indicate, by using a value of the subfield, namely, the Wi-Fi sensing trigger subtype, the second device to perform various service processes related to the trigger type "Wi-Fi sensing". Specifically, three reserved values may be selected from reserved values of the subfield "Wi-Fi sensing trigger subtype" of the trigger type "Wi-Fi sensing". The selected three reserved values are used to indicate the second device to perform service processes respectively corresponding to the Wi-Fi sensing poll frame, the Wi-Fi sensing sounding frame, and the Wi-Fi sensing report frame. For example, refer to the following Table 1.

TABLE 1

Values of the Wi-Fi sensing trigger subtype field

| Wi-Fi sensing trigger subtype field value | Meaning |
|---|---|
| 0 | Poll |
| 1 | Sounding |
| 2 | Feedback |

Optionally, the PRFs of the two pulse signals may be indicated by using a bitmap (bitmap). Table 2 shows a maximum non-ambiguity distance $R_u$ and a PRF value of a corresponding pulse signal in a bistatic case. In application, a proper PRF pulse signal may be selected according to a corresponding bit indication and $R_u$. For example, if a PRF 1 or a PRF 2 indicates 101, it indicates that a PRF of a pulse signal that needs to be sent is 15 MHz.

TABLE 2

Mapping between an $R_u$ and a PRF, and a bit indication relationship

| $R_u$ | PRF | Bit indication |
|---|---|---|
| None | None | 000/111 |
| 3 m | 100 MHz | 001 |
| 5 m | 60 MHz | 010 |
| 10 m | 30 MHz | 011 |
| 15 m | 20 MHz | 100 |
| 20 m | 15 MHz | 101 |
| 30 m | 10 MHz | 110 |

Optionally, the second device is one of a plurality of devices that assist the first device in performing pulse measurement on the target object; and the first device may simultaneously trigger a plurality of second devices to perform pulse measurement on the target object by using one first information frame, or the first device may trigger different devices in the plurality of second devices to perform pulse measurement on the target object by using different first information frames.

A channel multiplex ratio can be improved by simultaneously triggering, by using the same first information frame, the plurality of devices to perform pulse measurement.

In another embodiment, the first device may alternatively send the two types of pulse signals, and the two types of pulse signals may be sent by the first device after the first device sends a same downlink null data packet DL NDP. Optionally, the two types of pulse signals may alternatively be separately sent by the first device after the first device sends different downlink null data packets DL NDPs.

Compared with sending a pulse signal by the second device, sending the two types of pulse signals by the first device can reduce time resources required in an entire measurement process, and more efficient target locating is implemented. In addition, the second device can also obtain a location of a measured object. In addition, the two types of pulse signals are sent after the same downlink null data packet DL NDP is sent. Therefore, an interaction process can be shortened, channel resources can be reduced, and measurement efficiency can be improved.

Before the first device sends the two types of pulse signals, the first device may send a second information frame to the second device, to notify the second device that the first device is to perform pulse measurement on the target object.

Figure 18:
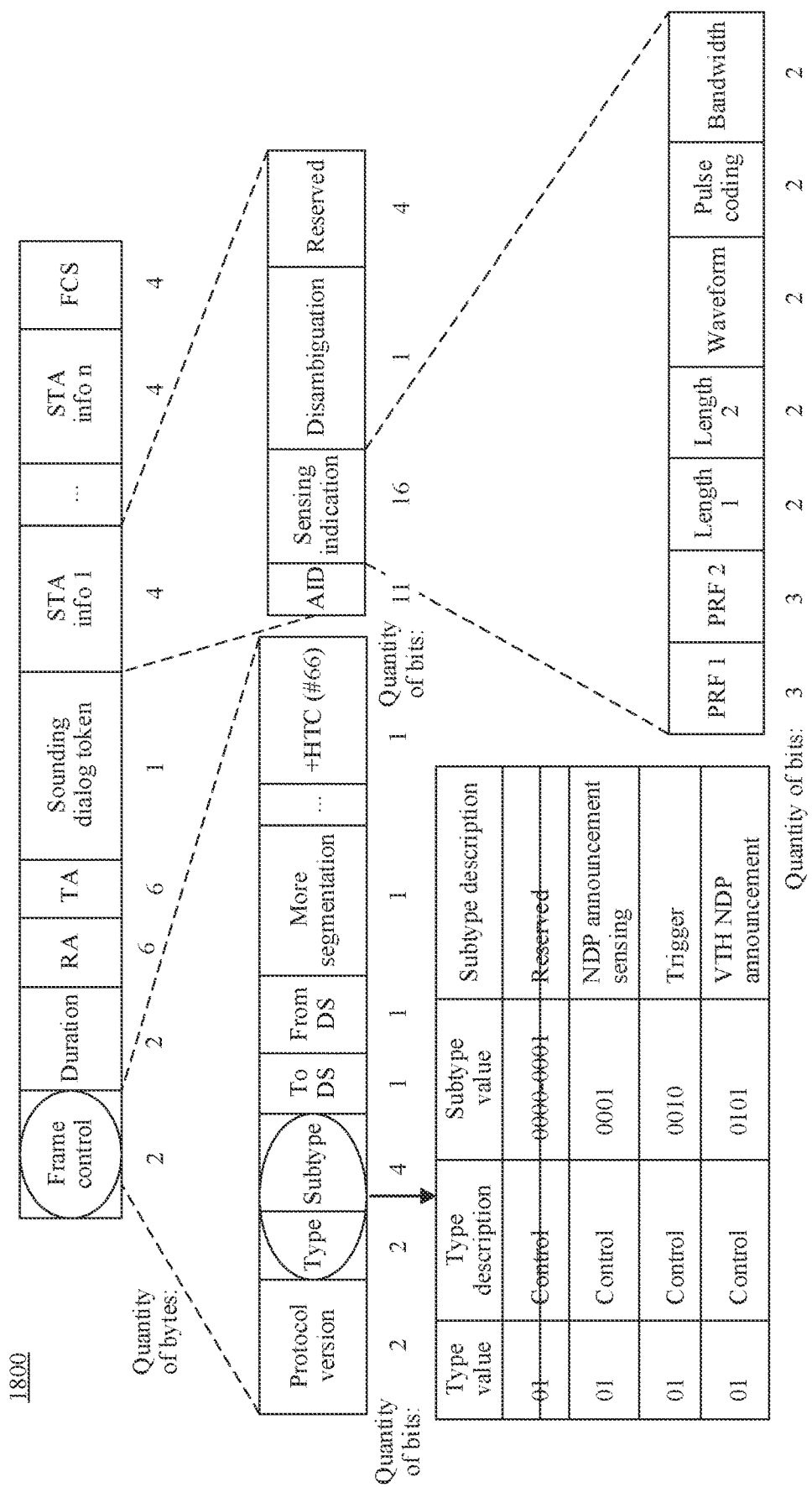
FIG. 18 is a schematic diagram of a second information frame (NDPA for reserving a downlink resource) according to an embodiment of this application.

In a specific example, the second information frame may have a structure shown in FIG. 18. As shown in FIG. 18, the second information frame (TF Wi-Fi sensing NDPA frame) may include a frame control (frame control) domain, a duration (duration) domain, an RA domain, a TA domain, a sounding dialog token (sounding dialog token) domain, a plurality of STA info (STA info) domains, and a frame check sequence (frame check sequence, FCS) domain. The frame control (frame control) domain may include a protocol version (protocol version) field, a type (type) field, a subtype (subtype) field, a to DS (to DS) field, a from DS (from DS) field, a more segmentation field, and a +HTC (#66) field. A reserved bit, for example, a value=0001, of the subtype, is used to define an NDPA used for perception. One user info (STA info) field may be selected, and a special AID value is set, for example, an AID=2046 or another undefined value within 11 bits. The AID value indicates setting of a field following the AID value is different from setting of another field in the STA info domain in the HE NDPA field. A sensing indication (sensing indication) has a same meaning as the sensing indication in the first information frame (Wi-Fi sensing sounding), and is used to indicate a parameter of a pulse measurement signal.

It should be understood that, before the pulse measurement is performed, the first device may send a third information frame to the second device. The third information frame is used to query whether the second device participates in the pulse measurement of the target object.

Figure 15:
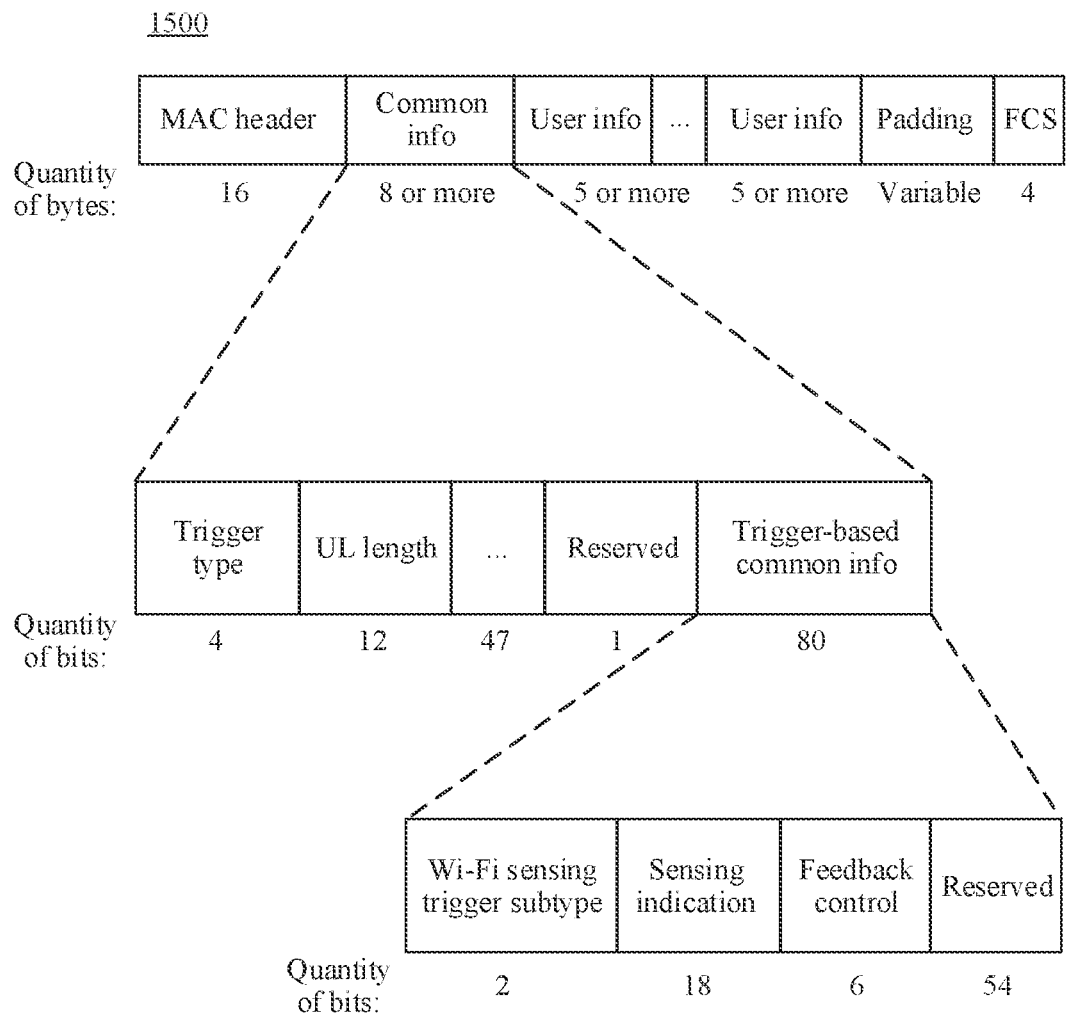
FIG. 15 is a schematic diagram of a third information frame (request frame) according to an embodiment of this application.

In a specific example, the third information frame may have a structure shown in FIG. 15. As shown in FIG. 15, in the frame, a Wi-Fi sensing trigger subtype (Wi-Fi sensing trigger subtype) field is set to a poll mode, and a sensing indication (sensing indication) and feedback control (feedback control) are set to reserved bits. A format of another field is the same as a format of a poll frame in FTM.

In an embodiment, in a process in which the first device performs pulse measurement with assistance of the second device, the first device may send a fourth information frame (a Wi-Fi sensing report frame (Wi-Fi sensing report)) to the second device, to indicate the second device to report a measurement result to the first device. Optionally, the fourth information frame includes first indication information and/or second indication information, the first indication information is used to indicate whether the second device needs to report a pulse measurement result of the target object, and the second indication information is used to indicate whether the second device needs to report an FTM measurement result.

Figure 17:
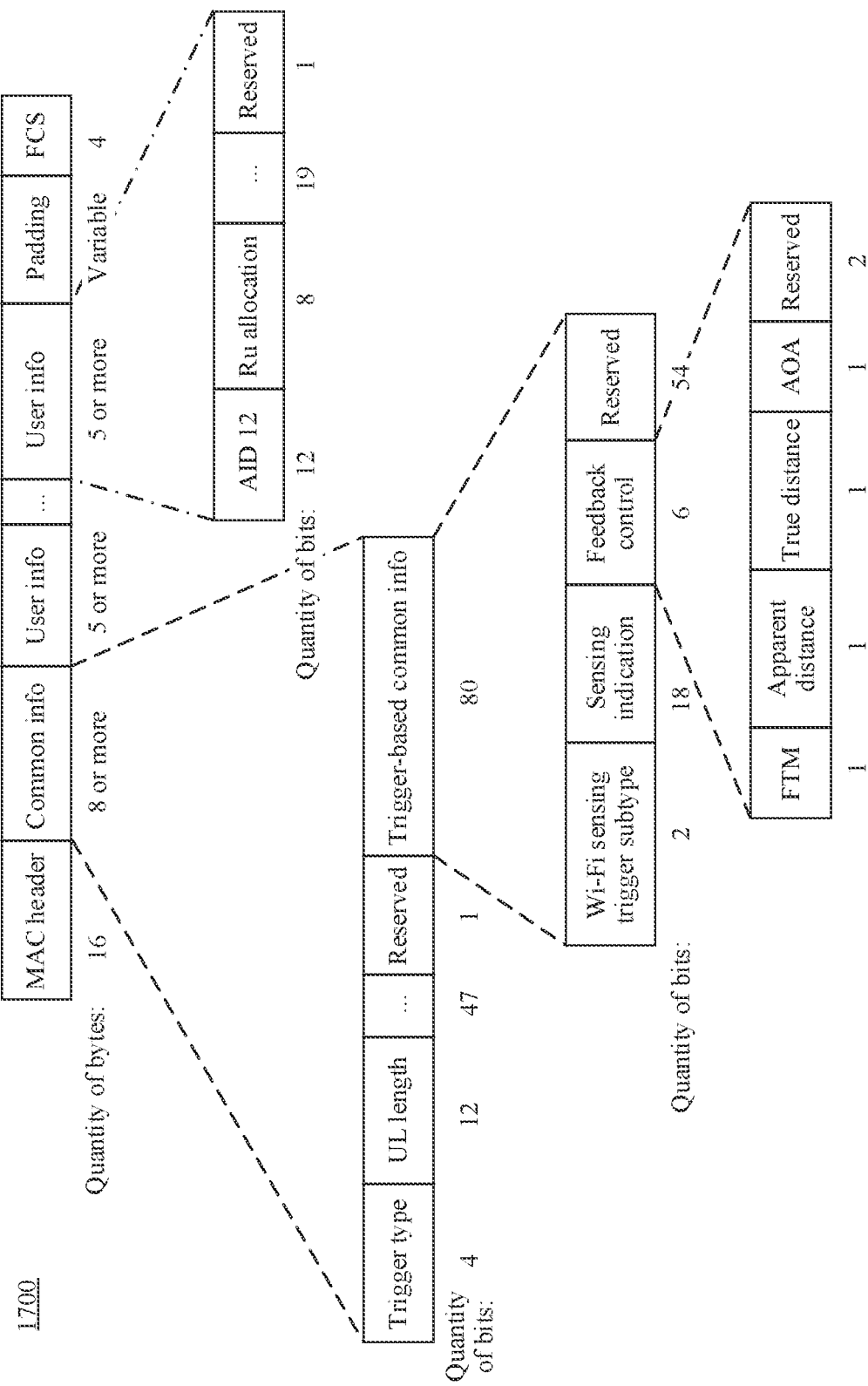
FIG. 17 is a schematic diagram of a fourth information frame (feedback frame) according to an embodiment of this application.

In a specific example, the fourth information frame may have a structure shown in FIG. 17. In the fourth information frame (Wi-Fi sensing feedback), when fields are 1, it indicates that a STA needs to feed back the information frame, and when the fields are 0, it indicates that the STA does not need to feed back the information. As shown in FIG. 17, the fourth information frame may include a MAC header domain, a common info domain, one or more user info domains, a padding domain, and an FCS domain. The common info domain may include a trigger type (trigger type) field, a UL length field, a reserved field, and a trigger dependent common info (trigger dependent common info) field. A six-bit feedback control subfield is set in the trigger dependent common info field, and is used to indicate types of the measurement result feedback by the second device, including an FTM measurement result, apparent distances ($t_1$ and $t_2$ in the principle part), a calculated actual distance (actual distance), and an angle of arrival AOA at which the second device receives a pulse signal. The FTM measurement result is a ranging result in 11 az.

It should be understood that the FTM measurement and the pulse measurement in embodiments of this application are not forcibly bound, and may be separately performed.

S520: The first device locates the target object based on the pulse measurement result.

It should be understood that the first device may locate the object based on a location of the second device and the measurement result.

FIG. 6 is a schematic diagram of another object locating method according to an embodiment of this application. As shown in FIG. 6, the method 600 includes a step S610. The following describes the step in detail.

S610: A second device assists a first device in performing pulse measurement on a target object.

In an embodiment, the pulse measurement is performed on the target object by using two types of pulse signals, and pulse repetition frequencies of the two types of pulse signals are different.

Optionally, the pulse repetition frequencies of the two types of pulse signals are prime numbers of each other.

In an embodiment, the two types of pulse signals may be sent by the second device. In this case, the second device may receive a first information frame sent by the first device, where the first information frame is used to trigger the second device to perform pulse measurement on the target object by using a target pulse signal, and the target pulse signal is one or two of the two types of pulse signals.

Optionally, the two pulse signals may be indicated by using a bitmap, which is specifically shown in the foregoing Table 1.

Optionally, the second device may be one of a plurality of devices that assist the first device in performing pulse measurement on the target object; and the first device simultaneously triggers a plurality of devices to perform pulse measurement on the target object by using one information frame, or the first device triggers different devices in the plurality of devices to perform pulse measurement on the target object by using different information frames.

A channel multiplex ratio can be improved by simultaneously triggering, by using the one information frame, the plurality of devices to perform pulse measurement on the target object.

In another embodiment, the two types of pulse signals may alternatively be sent by the first device. Before the first device sends the pulse signal, the second device may receive a second information frame sent by the first device, to notify the second device that the first device is to perform pulse measurement on the target object.

Optionally, before assisting, by the second device, the first device in performing pulse measurement on the target object, the second device may further receive a third information frame sent by the first device. The third information frame is used to query whether the second device participates in the pulse measurement of the target object.

Before assisting, by the second device, the first device in performing pulse measurement on the target object, the second device may further receive a fourth information frame sent by the first device, where the fourth information frame is used to indicate the second device to upload a measurement result. Optionally, the fourth information frame includes first indication information and/or second indication information, the first indication information is used to indicate whether the second device needs to report a pulse measurement result of the target object, and the second indication information is used to indicate whether the second device needs to report an FTM measurement result.

In a specific example, the first information frame, the second information frame, the third information frame, and the fourth information frame may have structures shown in FIG. 16, FIG. 18, FIG. 15, and FIG. 17. A specific structure thereof is the same as the structure described above. Details are not described herein again.

It should be understood that the FTM measurement and the pulse measurement in embodiments of this application are not forcibly bound, and may be separately performed.

Figure 7:
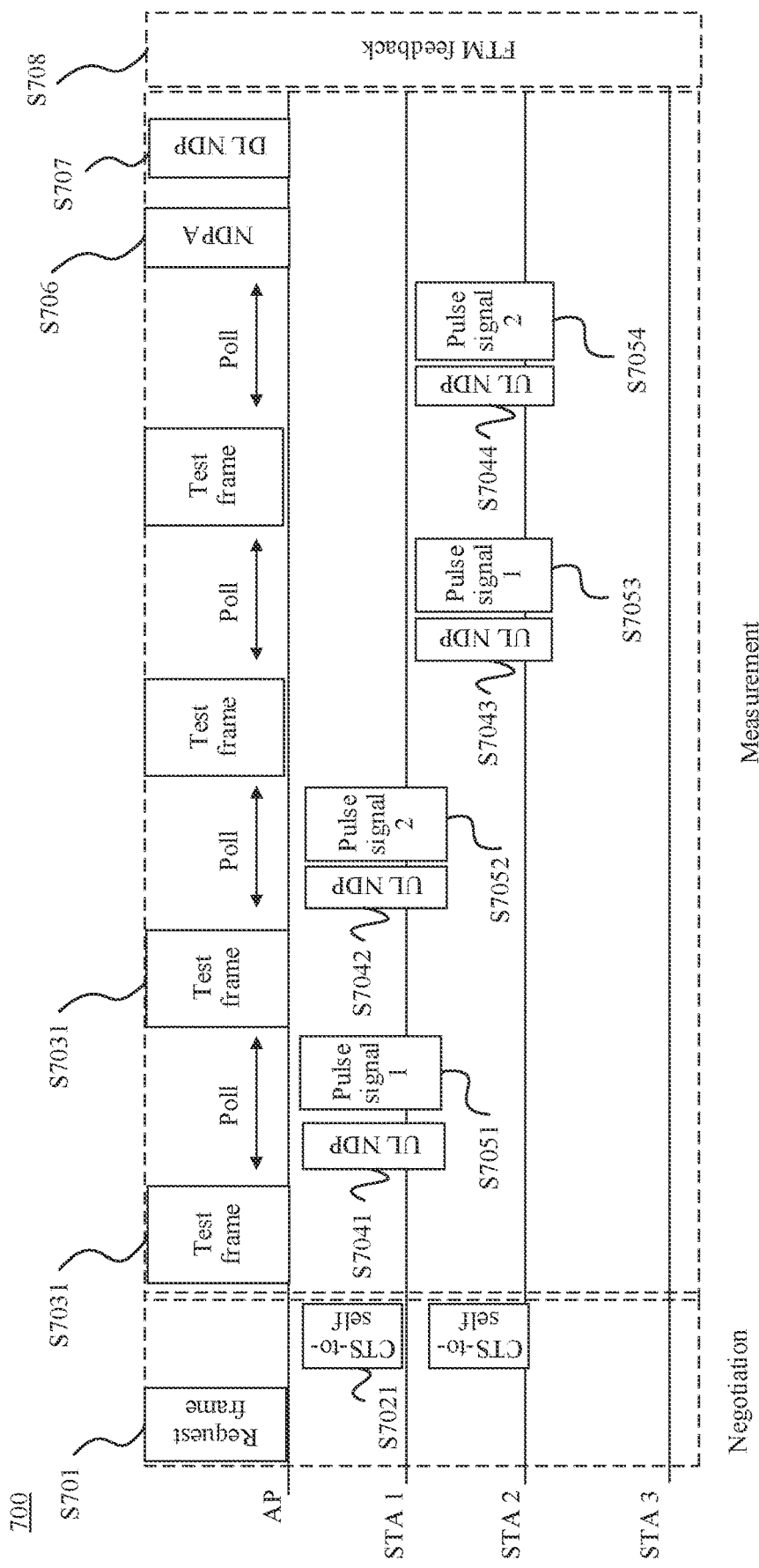
FIG. 7 is a schematic flowchart of an object locating method according to an embodiment of this application.

FIG. 7 is a schematic flowchart of an object locating method according to an embodiment of this application. As shown in FIG. 7, the method 700 includes steps S701 to S708. The following describes these steps in detail.

It should be understood that in this embodiment of this application, an example in which a first device and a second device are respectively an AP and a STA is used for description. This embodiment of this application may also be applicable to another device.

It should be understood that there may be one or more STAs in this embodiment of this application. This is not limited in this embodiment of this application.

S701: The AP sends a third information frame (request frame) to the STA, to notify the STA to participate in FTM-based pulse measurement.

S702: After receiving the request frame sent by the AP, the STA determines whether to participate in the pulse measurement, and if determining to participate in the pulse measurement, sends CTS-to-self to the AP.

Figure 8:
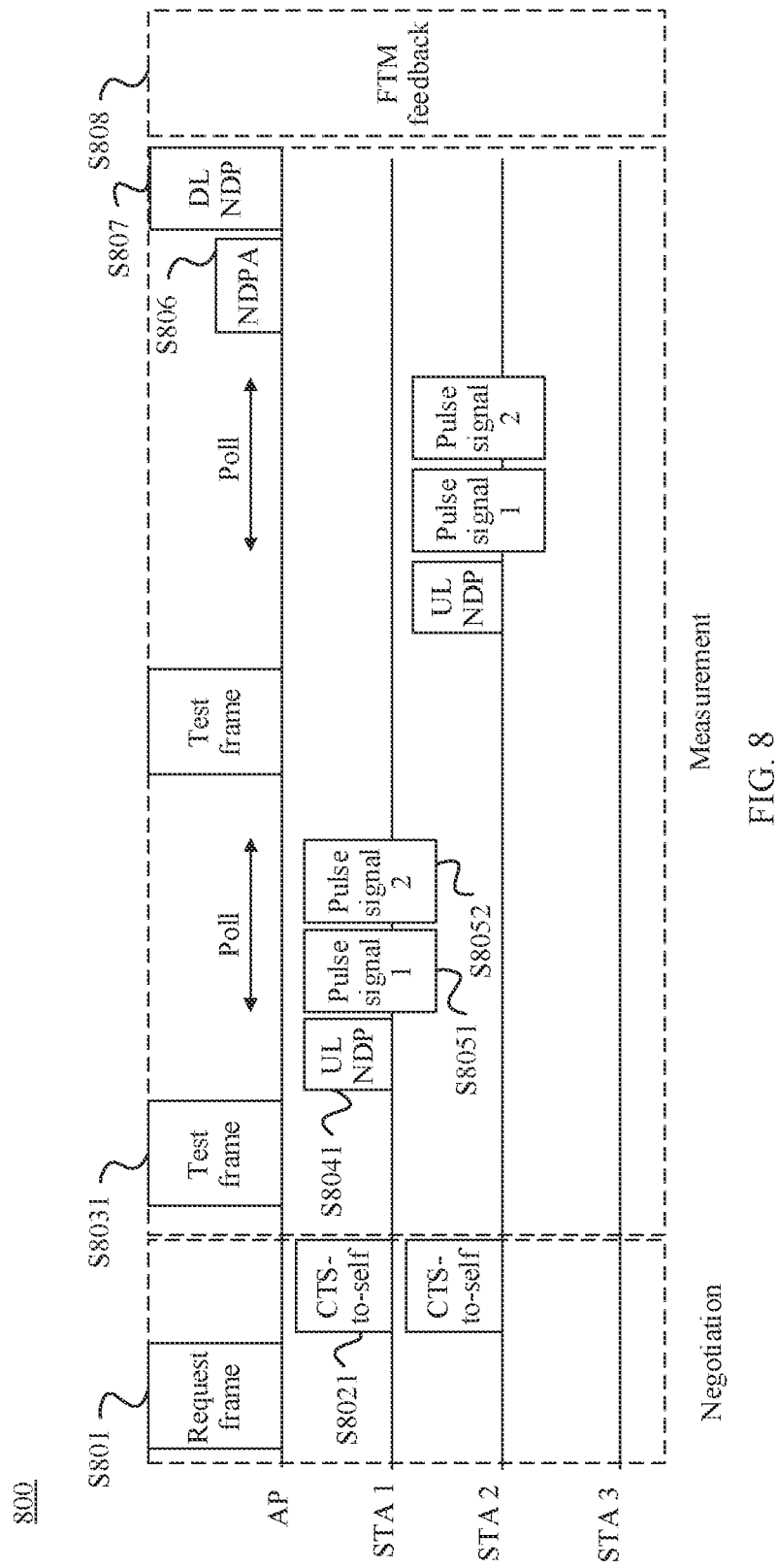
FIG. 8 is a schematic flowchart of another object locating method according to an embodiment of this application.

S703: The AP polls the STA by using a first information frame (test frame) to perform pulse measurement. This step may be performed for two times. To be specific, S7031 and S7032 are performed to indicate the STA to send a pulse signal 1 and a pulse signal 2 of different PRFs (which are prime numbers of each other) for measurement, for example, S7051 and S7052 shown in FIG. 7. Optionally, the AP may alternatively send the first information frame (test frame) for one time to poll the STA to perform pulse measurement and indicate the STA to send the pulse signal 1 and the pulse signal 2 of different PRFs (which are prime numbers of each other) for measurement, for example, S8031, S8051, and S8052 shown in FIG. 8.

After receiving the first information frame (test frame) sent by the AP, the STA returns an uplink null data packet (uplink null data packet, UL NDP) to the AP, and adds a pulse signal after the UL NDP to perform pulse measurement. Optionally, STAs participating in the pulse measurement reply to the UL NDP in a time division multiplexing manner, for example, S7041 and S7043 shown in FIG. 7. Alternatively, the STAs may reply to the UL NDP in a frequency division multiplexing manner, for example, S9041 and S9043 shown in FIG. 9.

Figure 9:
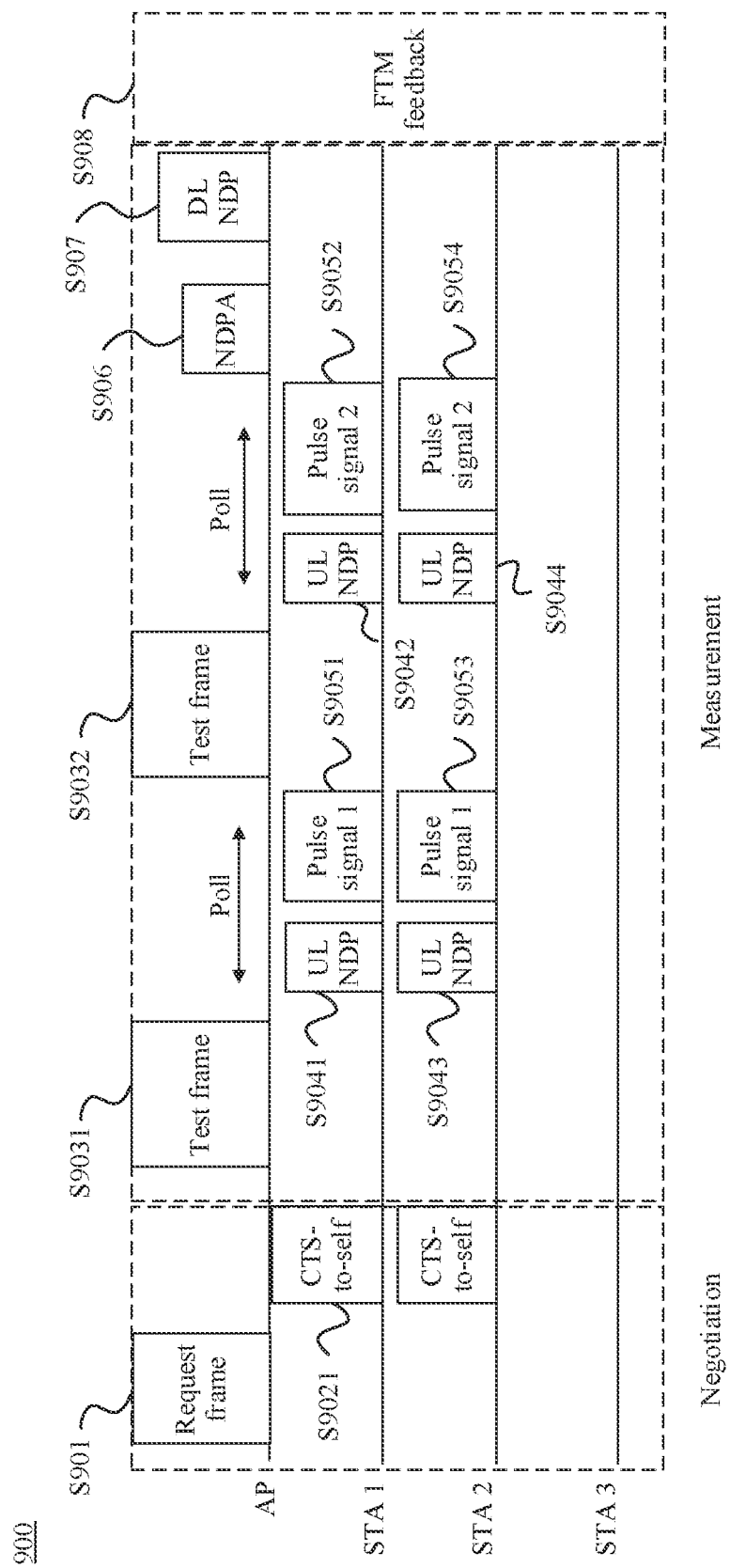
FIG. 9 is a schematic flowchart of still another object locating method according to an embodiment of this application.
Figure 10:
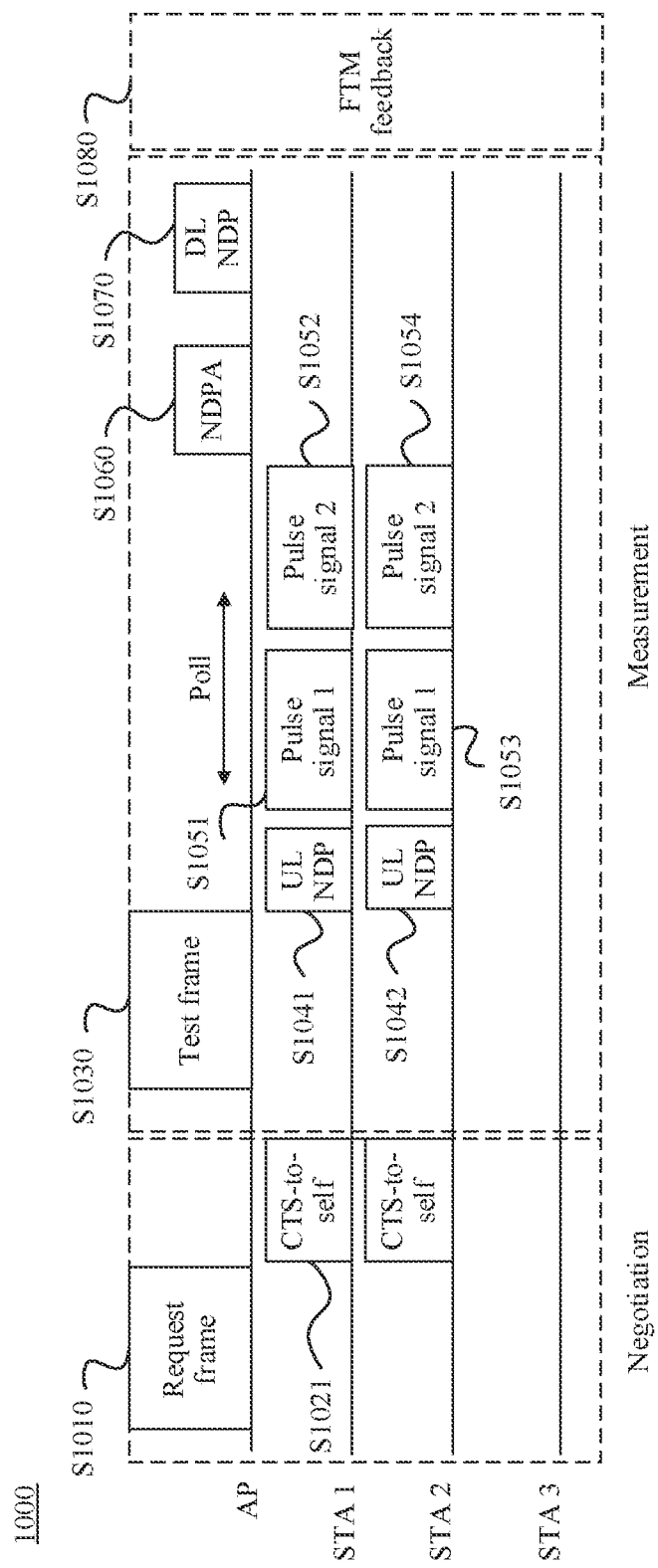
FIG. 10 is a schematic flowchart of still another object locating method according to an embodiment of this application.

Optionally, when pulse signals sent by a plurality of STAs are sent in the frequency division multiplexing manner, a pulse signal 1 and a pulse signal 2, of two PRFs, sent by each STA may be separately sent after the AP sends the test frame for two times, for example, S9031 and S9051, and S9032 and S9052 shown in FIG. 9. Alternatively, the pulse signal 1 and the pulse signal 2, of the two PRFs, sent by each STA may be sent after the AP sends the first information frame (test frame) for one time, for example, S1030, and S1051 and S1052 after S1030 shown in FIG. 10.

S706: The AP sends an NDPA (null data packet announcement) to reserve a downlink resource.

S707: The AP sends a downlink data packet (downlink null data packet, DL NDP) to the STA participating in the pulse measurement.

S708: The STA feeds back a measurement result to the AP, to complete a measurement process.

Optionally, the AP may obtain, through calculation, a location of a measured object according to the formulas (2) to (4) provided in embodiments of this application. Therefore, in S708, the STA may feed back only an FTM measurement result, where the FTM measurement result may include timestamps indicating when the uplink NDP and the downlink NDP leave and arrive at the STA. Similarly, in FIG. 8 to FIG. 10, the AP may obtain the location of the measured object through calculation according to the formulas (2 to 4) provided in embodiments of this application. Therefore, in S808, S908, and S1080, the STA may also feed back only the FTM measurement result.

Figure 11:
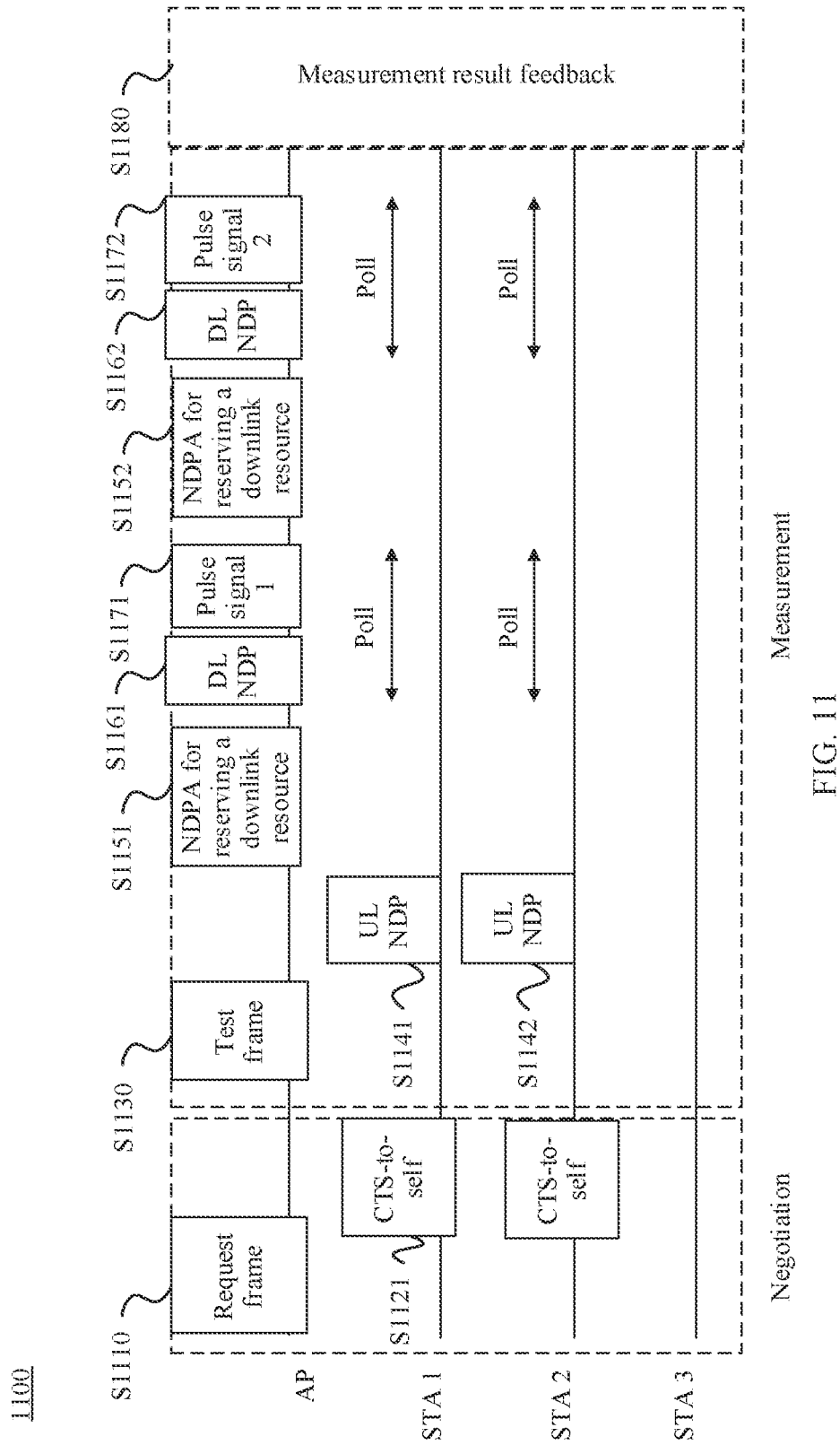
FIG. 11 is a schematic flowchart of still another object locating method according to an embodiment of this application.

FIG. 11 is a schematic flowchart of another object locating method according to an embodiment of this application. As shown in FIG. 11, the method 1100 includes S1110 to S1180. The following describes these steps in detail.

S1110: An AP sends a third information frame (request frame) to the STA, to notify a STA to participate in FTM-based pulse measurement.

S1120: A same STA participating in the pulse measurement returns CTS-to-self.

S1130: The AP sends a test frame, and schedules the STA to perform FTM measurement, where the test frame used herein is the same as a test frame in 11 az.

S1140: The same STA participating in the pulse measurement returns a UL NDP to start a measurement process.

S1150: The AP sends a second information frame (Wi-Fi sensing NDPA) to reserve a downlink resource.

Figure 12:
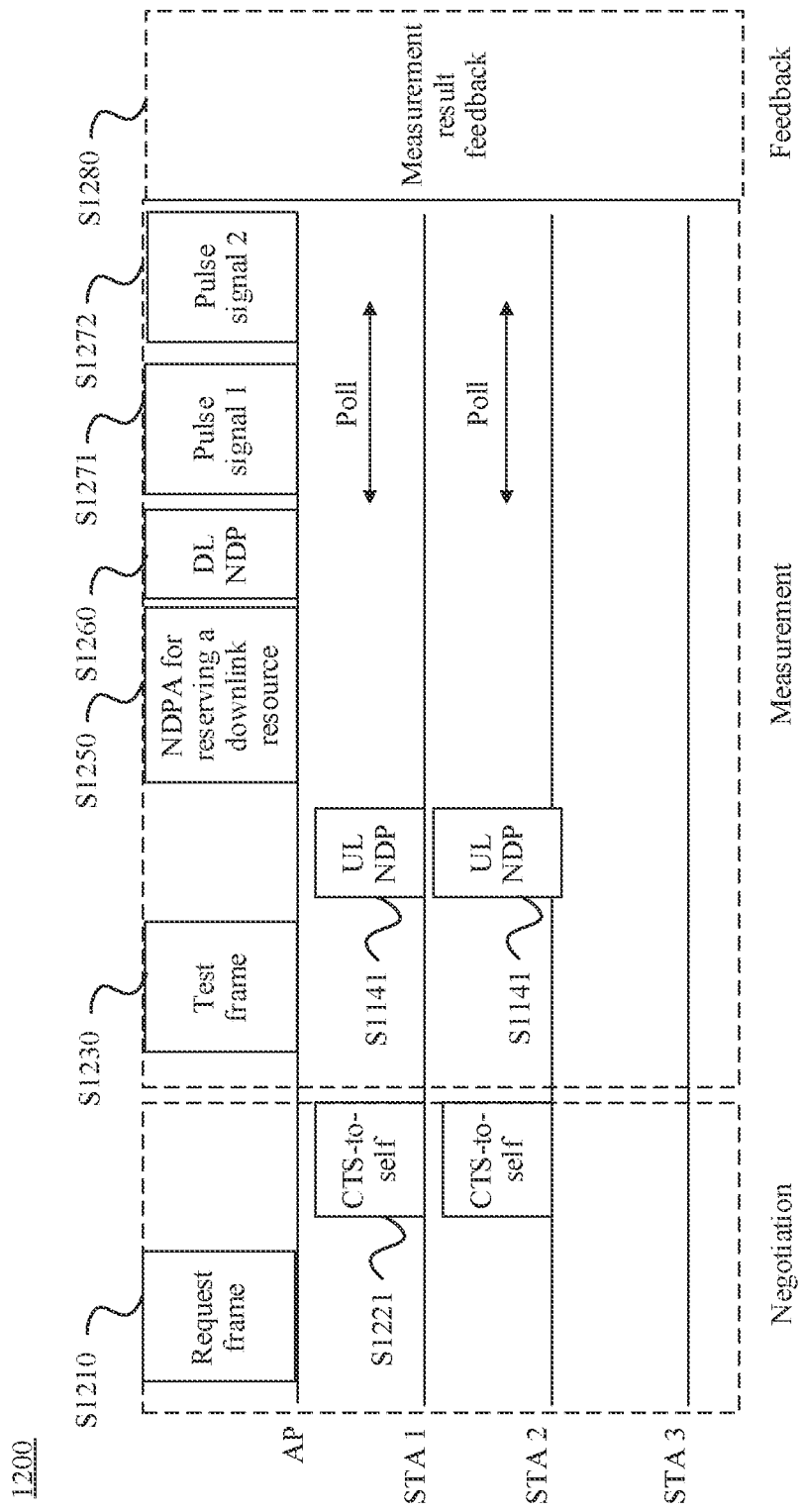
FIG. 12 is a schematic flowchart of still another object locating method according to an embodiment of this application.

S1160: The AP sends a DL NDP. A pulse signal is added after this step, namely, S1170. Optionally, this step may be performed for two times. To be specific, the AP sends the DL NDP for two times by reserving the downlink resource for two times, and then separately sends a pulse signal 1 and a pulse signal 2, for example, S1151, S1171, S1152, and S1172 shown in FIG. 11. Alternatively, this step may be performed for one time. To be specific, the AP reserves the downlink resource for only one time. After sending the DL NDP for one time, the AP sequentially sends the pulse signal 1 and the pulse signal 2, for example, S1250, S1271, and S1272 shown in FIG. 12. In addition, a test frame used in sending a test frame in FIG. 12, namely, S1230, is also the same as the test frame in 11 az.

Figure 13:
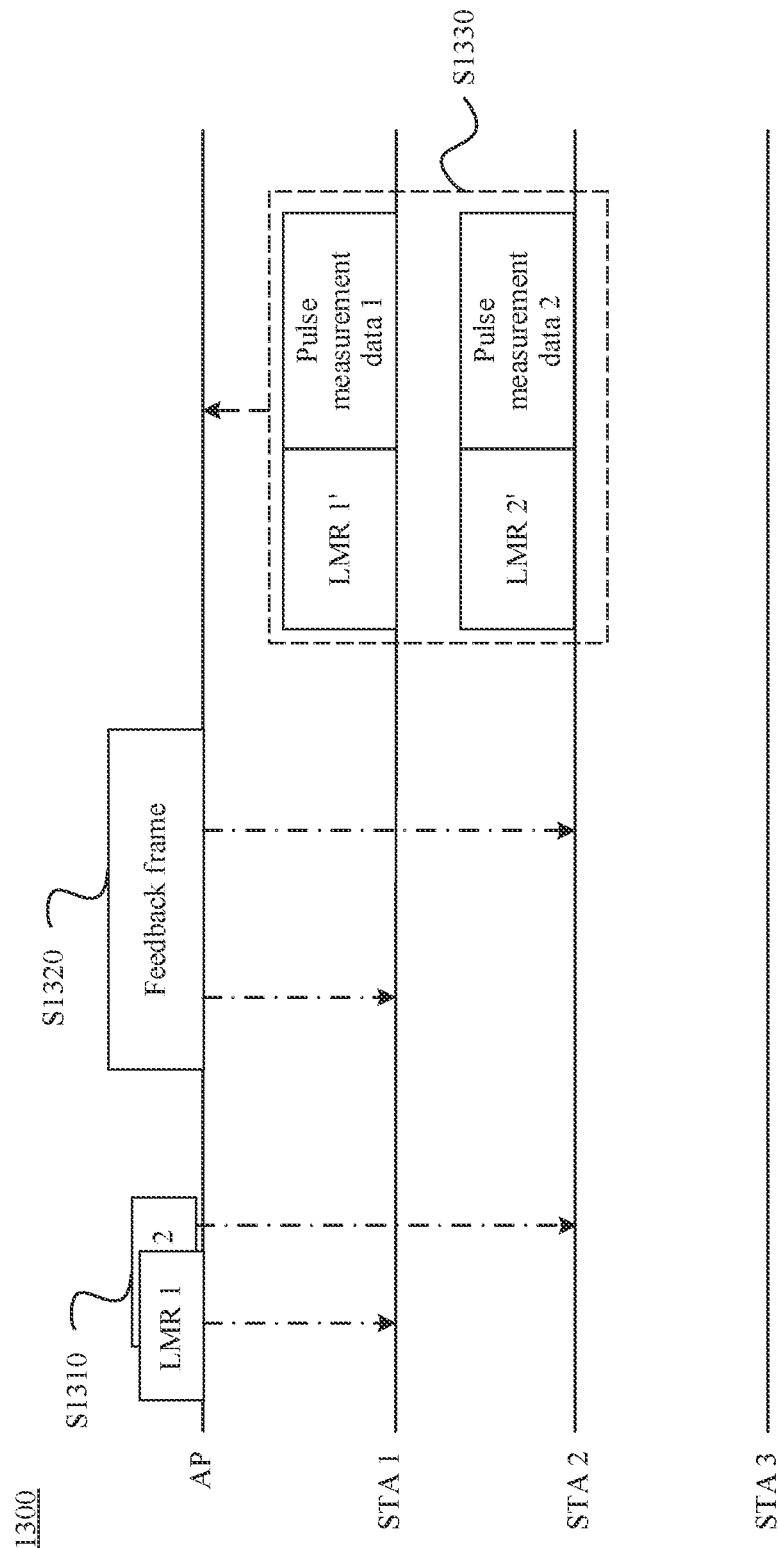
FIG. 13 is a schematic diagram of a measurement result feedback method according to an embodiment of this application.
Figure 14:
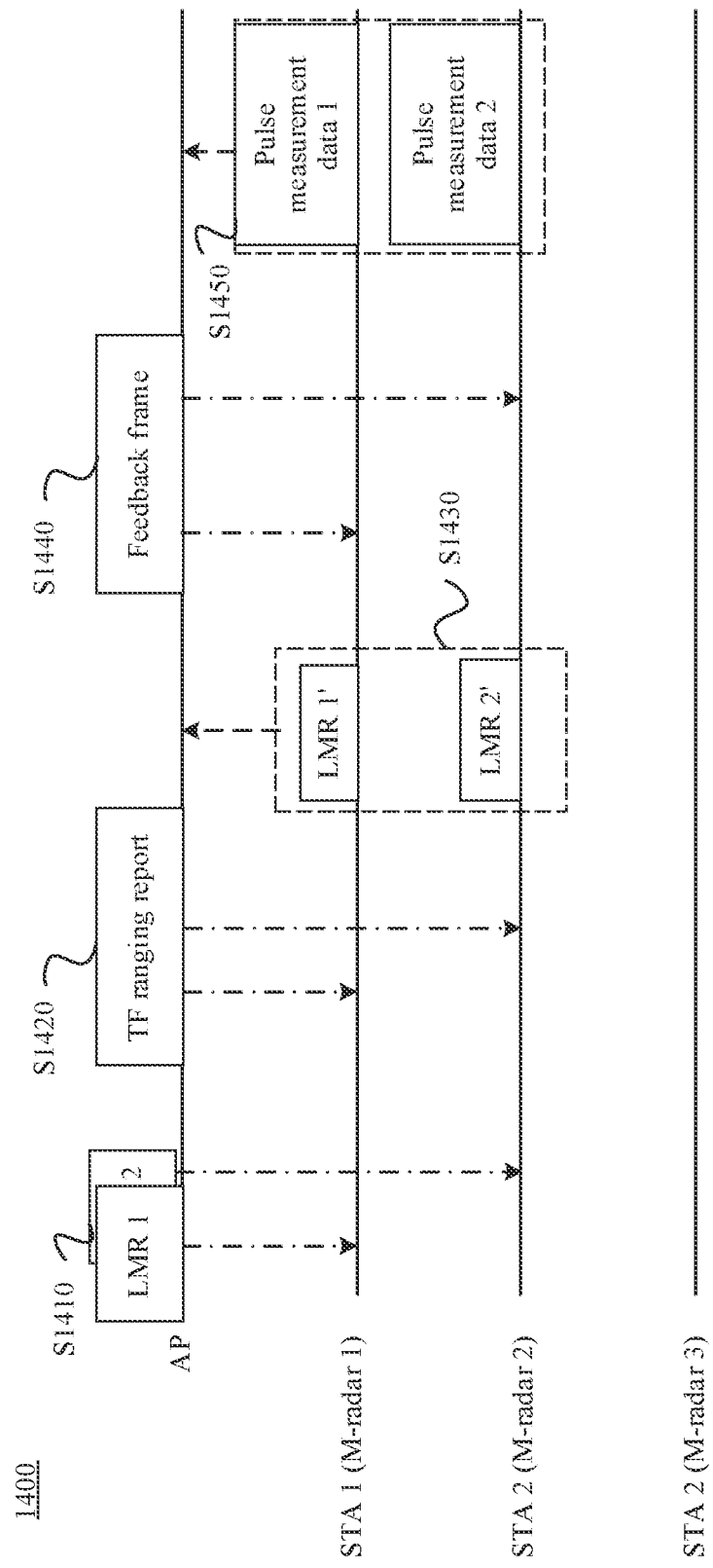
FIG. 14 is a schematic diagram of another measurement result feedback method according to an embodiment of this application.

S1180: After the pulse measurement ends, the STA feeds back an FTM measurement result and a pulse measurement result to the AP. The FTM measurement result may include timestamps indicating when the uplink NDP and the downlink NDP leave and arrive at the STA, and the pulse measurement result includes an AOA (an angle of arrival at which the STA receives the pulse signal) of the pulse signal received by the STA and distance information (apparent distances t1 and t2, or an actual distance). The measurement method has a plurality of result feedback manners. FIG. 13 and FIG. 14 show two different measurement result feedback methods. As shown in FIG. 13, the method 1300 includes S1310 to S1330.

S1310: An AP sends an LRM frame to a STA in a frequency division multiplexing manner.

S1320: The AP sends a fourth information frame (feedback frame) to the STA, to trigger the STA to feed back measurement information to the AP.

S1330: The STA returns an LMR frame and pulse measurement data to the AP in the frequency division multiplexing manner, where the LMR includes an FTM measurement result, and the pulse measurement data includes a pulse measurement result. Optionally, in the process, the step in which the AP sends the LMR frame, namely, S1310, may be omitted because this step is mainly performed by the AP to notify STAs of FTM results of the STAs, and is not necessary in this embodiment of this application.

FIG. 14 shows another measurement result feedback manner, including steps S1410 to S1450. The method 1400 is similar to the method 1300 in FIG. 13. A difference is that, in FIG. 14, an FTM measurement result and a pulse measurement result are separately reported. In other words, S1330 in FIG. 13 may be represented as S1430 and S1450 in FIG. 14.

Figure 19:
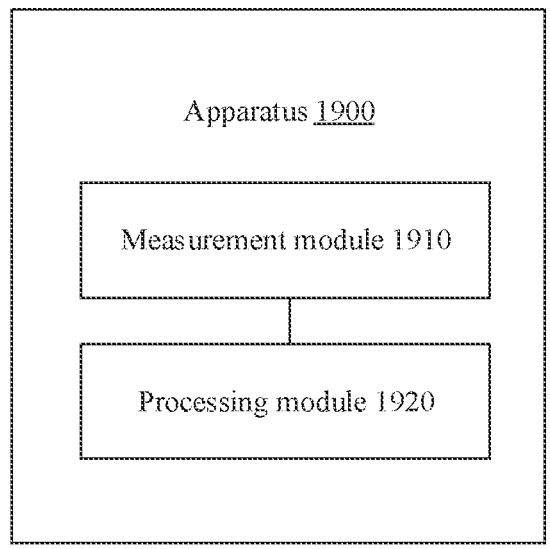
FIG. 19 is a schematic diagram of an apparatus according to an embodiment of this application.

FIG. 19 is a schematic diagram of an apparatus according to an embodiment of this application. As shown in FIG. 19, the apparatus 1900 includes a measurement module 1910 and a processing module 1920.

The measurement module is configured to perform pulse measurement on a target object with assistance of a second device. The pulse measurement is performed on the target object by using two types of pulse signals, and pulse repetition frequencies of the two types of pulse signals are different. The processing module is configured to locate the target object based on a pulse measurement result.

Optionally, the pulse repetition frequencies of the two types of pulse signals are prime numbers of each other.

Optionally, the pulse measurement is performed in a fine timing measurement FTM process of the first device and the second device.

Optionally, the two types of pulse signals are both sent by the second device.

Optionally, the apparatus further includes a first sending module, configured to send a first information frame to the second device. The first information frame is used to trigger the second device to perform pulse measurement on the target object by using a target pulse signal, and the target pulse signal is one or two of the two types of pulse signals.

Optionally, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

Optionally, the indication information used to indicate the second device to perform pulse measurement includes one or more of the following parameters of the target pulse signal: a pulse repetition frequency, a duration length, a waveform, a coding scheme, and occupied bandwidth.

Optionally, the pulse repetition frequency of the target pulse signal is indicated by using a bitmap.

It should be understood that the second device is one of a plurality of devices that assist the first device in performing pulse measurement on the target object; and the first device simultaneously triggers the plurality of devices to perform pulse measurement on the target object by using one first information frame, or the first device triggers different devices in the plurality of devices to perform pulse measurement on the target object by using different first information frames.

Optionally, the apparatus further includes a second sending module, configured to send the two types of pulse signals.

Optionally, the apparatus further includes a third sending module, configured to send a second information frame to the second device. The second information frame is used to notify the second device that the first device is to perform pulse measurement on the target object.

Optionally, a subtype field in a frame control field in the second information frame includes an identifier of the second information frame.

Optionally, a station info field, having a special AID value, in the second information frame includes a parameter of a target pulse signal used by the first device, and the target pulse signal is one or two of the two types of pulse signals.

Optionally, the apparatus further includes a fourth sending module, configured to send a third information frame to the second device. The third information frame is used to query whether the second device participates in the pulse measurement of the target object.

Optionally, the apparatus further includes a fifth sending module, configured to send a fourth information frame to the second device. The fourth information frame includes first indication information and/or second indication information, the first indication information is used to indicate whether the second device needs to report a pulse measurement result of the target object, and the second indication information is used to indicate whether the second device needs to report an FTM measurement result.

Optionally, the fourth information frame includes a common info field, and the first indication information and the second indication information are included in a feedback control field in the common info field.

Figure 20:
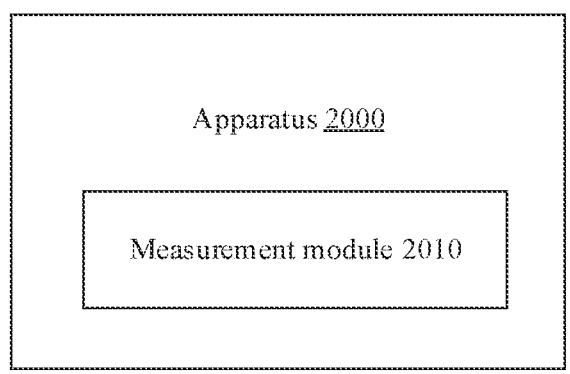
FIG. 20 is a schematic diagram of another apparatus according to an embodiment of this application.

FIG. 20 is a schematic diagram of another apparatus according to an embodiment of this application. As shown in FIG. 20, the apparatus 2000 includes a measurement module 2010.

The measurement module 2010 is configured to assist a first device in performing pulse measurement on a target object. The pulse measurement is performed on the target object by using two types of pulse signals, and pulse repetition frequencies of the two types of pulse signals are different.

Optionally, the pulse repetition frequencies of the two types of pulse signals are prime numbers of each other.

Optionally, the pulse measurement is performed in a fine timing measurement FTM process of the first device and a second device.

Optionally, the apparatus further includes a first sending module, configured to send the two types of pulse signals.

Optionally, the apparatus further includes a first receiving module, configured to receive a first information frame sent by the first device. The first information frame is used to trigger the second device to perform pulse measurement on the target object by using a target pulse signal, and the target pulse signal is one or two of the two types of pulse signals.

Optionally, a trigger-dependent common info field in the first information frame includes indication information used to indicate the second device to perform pulse measurement; or a user info domain field in the first information frame includes an application identifier field and a trigger-dependent user info field, and the trigger-dependent user info field includes indication information used to indicate the second device to perform pulse measurement.

Optionally, the indication information used to indicate the second device to perform pulse measurement includes one or more of the following parameters of the target pulse signal: a pulse repetition frequency, a duration length, a waveform, a coding scheme, and occupied bandwidth.

Optionally, the pulse repetition frequency of the target pulse signal is indicated by using a bitmap.

Optionally, the second device is one of a plurality of devices that assist the first device in performing pulse measurement on the target object; and the first device simultaneously triggers the plurality of devices to perform pulse measurement on the target object by using one information frame, or the first device triggers different devices in the plurality of devices to perform pulse measurement on the target object by using different information frames.

Optionally, the two types of pulse signals are both sent by the first device.

Optionally, the apparatus further includes a second receiving module, configured to receive a second information frame sent by the first device. The second information frame is used to notify the second device that the first device is to perform pulse measurement on the target object.

Optionally, a subtype field in a frame control field in the second information frame includes an identifier of the second information frame.

Optionally, a station info field, having a special AID value, in the second information frame includes a parameter of a target pulse signal used by the first device, and the target pulse signal is one or two of the two types of pulse signals.

Optionally, the apparatus further includes a third receiving module, configured to receive a third information frame sent by the first device. The third information frame is used to query whether the second device participates in the pulse measurement of the target object.

Optionally, the apparatus further includes a fourth receiving module, configured to receive a fourth information frame sent by the first device. The fourth information frame includes first indication information and/or second indication information, the first indication information is used to indicate whether the second device needs to report a pulse measurement result of the target object, and the second indication information is used to indicate whether the second device needs to report an FTM measurement result.

Optionally, the fourth information frame includes a common info field, and the first indication information and the second indication information are included in a feedback control field in the common info field.

In the several embodiments provided in this application, it should be understood that the disclosed systems, apparatuses, and methods may be implemented in other manners. For example, the described apparatus embodiments are merely examples. For example, module division is merely logical function division and may be other division in an actual implementation.

When a method provided by embodiments of this application is implemented in a form of a software functional unit and sold or used as an independent product, the method may be stored in a computer-readable storage medium. Based on such an understanding, the technical solutions of this application or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes at least any medium, for example, a USB flash drive, a removable hard disk, a read-only memory (read-only memory, ROM), a random access memory (random access memory, RAM), a magnetic disk, an optical disc, or the like that can store program code. The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An object locating method, comprising:
   sending, by a first device, a first information frame to a second device for a first time and a second time;
   performing, by the first device, pulse measurement on a target object by using a first type of pulse signal and a second type of pulse signal sent by the second device, wherein the first type of pulse signal is sent by the second device after the first information frame is sent to the second device for the first time, and the second type of pulse signal is sent by the second device after the first information frame is sent to the second device for the second time, and wherein pulse repetition frequencies of the first type of pulse signal and the second type of pulse signal are different; and
   locating, by the first device, the target object based on a pulse measurement result of the pulse measurement.

2. The method according to claim 1, wherein the pulse repetition frequencies of the two types of pulse signals are prime numbers of each other.

3. The method according to claim 2, wherein the pulse measurement is performed in a fine timing measurement (FTM) process of the first device and the second device.

4. The method according to claim 3,
   wherein the first information frame triggers the second device to perform pulse measurement on the target object by using a target pulse signal, and the target pulse signal is one or two of the first type of pulse signal and the second type of pulse signal.

5. The method according to claim 3, wherein the first type of pulse signal and the second type of pulse signal are both sent by the first device, and wherein the performing, by the first device, pulse measurement on the target object with assistance of the second device comprises:
   sending, by the first device, a second information frame to the second device, wherein the second information frame notifies the second device that the first device is to perform pulse measurement on the target object.

6. The method according to claim 5, wherein a subtype field in a frame control field in the second information frame comprises an identifier of the second information frame.

7. The method according to claim 5, wherein a station info field, having a special application identifier (AID) value, in the second information frame comprises a parameter of a target pulse signal used by the first device, and the target pulse signal is one or two of the first type of pulse signal and the second type of pulse signal.

8. The method according to claim 7, wherein the performing, by the first device, pulse measurement on the target object with assistance of the second device comprises:
   sending, by the first device, a third information frame to the second device, wherein the third information frame is used to query whether the second device participates in the pulse measurement of the target object.

9. The method according to claim 8, wherein the performing, by the first device, pulse measurement on the target object with assistance of the second device comprises:
   sending, by the first device, a fourth information frame to the second device, wherein the fourth information frame comprises at least one of first indication information or second indication information, the first indication information indicates whether the second device needs to report a pulse measurement result of the target object, and the second indication information indicates whether the second device needs to report an FTM measurement result.

10. The method according to claim 9, wherein the fourth information frame comprises a common info field, and the first indication information and the second indication information are comprised in a feedback control field in the common info field.

11. The method according to claim 1, wherein:
a trigger-dependent common info field in the first information frame comprises indication information indicating the second device to perform pulse measurement; or
a user info domain field in the first information frame comprises an application identifier field and a trigger-dependent user info field, and the trigger-dependent user info field comprises indication information indicating the second device to perform pulse measurement.

12. The method according to claim 11, wherein the indication information indicating the second device to perform pulse measurement comprises one or more of the following parameters of the target pulse signal: a pulse repetition frequency, a duration length, a waveform, a coding scheme, and occupied bandwidth.

13. The method according to claim 12, wherein the pulse repetition frequency of the target pulse signal is indicated by using a bitmap.

14. The method according to claim 13, wherein the second device is one of a plurality of devices that assist the first device in performing pulse measurement on the target object, and wherein:
the first device simultaneously triggers the plurality of devices to perform pulse measurement on the target object by using one first information frame; or
the first device triggers different devices in the plurality of devices to perform pulse measurement on the target object by using different first information frames.

15. An object locating method, comprising:
receiving, by a second device, a first information frame from a first device for a first time and a second time;
assisting, by a second device, a first device in performing pulse measurement on a target object, wherein the pulse measurement is performed on the target object by using a first type of pulse signal and a second type of pulse signal, and pulse repetition frequencies of the first type of pulse signal and the second type of pulse signal are different, and wherein the assisting comprises:
after receiving, by the second device, a first information frame from the first device for a first time, sending, by the second device, the first type of pulse signal; and
after receiving, by the second device, the first information frame from the first device for a second time, sending, by the second device, the second type of pulse signal.

16. The method according to claim 15, wherein the pulse repetition frequencies of the two types of pulse signals are prime numbers of each other.

17. The method according to claim 16, wherein the pulse measurement is performed in a fine timing measurement (FTM) process of the first device and the second device.

18. The method according to claim 17,
wherein the first information frame triggers the second device to perform pulse measurement on the target object by using a target pulse signal, and the target pulse signal is one or two of the two types of pulse signals.

19. The method according to claim 15, wherein:
a trigger-dependent common info field in the first information frame comprises indication information indicating the second device to perform pulse measurement; or
a user info domain field in the first information frame comprises an application identifier field and a trigger-dependent user info field, and the trigger-dependent user info field comprises indication information indicating the second device to perform pulse measurement.

20. The method according to claim 19, wherein the indication information indicating the second device to perform pulse measurement comprises one or more of the following parameters of the target pulse signal: a pulse repetition frequency, a duration length, a waveform, a coding scheme, and occupied bandwidth.

* * * * *